US009383822B2

(12) United States Patent
Wakuda et al.

(10) Patent No.: US 9,383,822 B2
(45) Date of Patent: *Jul. 5, 2016

(54) METHOD FOR PRESENTING TACTILE SENSATION AND DEVICE THEREFOR

(71) Applicant: Panasonic Corporation, Osaka (JP)

(72) Inventors: Daisuke Wakuda, Osaka (JP); Takeshi Suzuki, Osaka (JP); Tetsuyoshi Ogura, Osaka (JP); Koichi Hirano, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 135 days.

This patent is subject to a terminal disclaimer.

(21) Appl. No.: 14/344,772

(22) PCT Filed: Jun. 20, 2013

(86) PCT No.: PCT/JP2013/003871
§ 371 (c)(1),
(2) Date: Mar. 13, 2014

(87) PCT Pub. No.: WO2014/002450
PCT Pub. Date: Jan. 3, 2014

(65) Prior Publication Data
US 2014/0340210 A1 Nov. 20, 2014

(30) Foreign Application Priority Data

Jun. 29, 2012 (JP) ................. 2012-147244
Jul. 18, 2012 (JP) ................. 2012-159780
Jul. 18, 2012 (JP) ................. 2012-159783
Jul. 18, 2012 (JP) ................. 2012-159785
Aug. 1, 2012 (JP) ................. 2012-171418

(51) Int. Cl.
*G08B 6/00* (2006.01)
*G06F 3/0488* (2013.01)
(Continued)

(52) U.S. Cl.
CPC .............. *G06F 3/016* (2013.01); *G06F 3/041* (2013.01); *G06F 3/044* (2013.01); *G06F 3/0412* (2013.01); *G06F 3/0488* (2013.01); *G06F 3/04883* (2013.01); *G08B 6/00* (2013.01)

(58) Field of Classification Search
CPC ....... G06F 3/041; G06F 3/0412; G06F 3/044; G06F 3/0488; G06F 3/04883; G06F 3/016; G06F 3/033; G06F 2203/04809; G06F 3/0202; G06F 3/04886; G06F 3/04895; G06F 2203/014; G06F 2203/0339; G06F 3/03; G08B 6/00; H03K 2217/96062; H04N 13/0011; H04N 13/0022
USPC ............... 340/407.1, 407.2; 345/173, 174
See application file for complete search history.

(56) References Cited

U.S. PATENT DOCUMENTS 7,924,144 B2  4/2011  Makinen et al.
7,982,588 B2  7/2011  Makinen et al.
(Continued)

FOREIGN PATENT DOCUMENTS

JP    2002-041208    2/2002
JP    2003-248540    9/2003
(Continued)

OTHER PUBLICATIONS

U.S. Office Action issued Jul. 17, 2015 in U.S. Appl. No. 14/241,639.
(Continued)

*Primary Examiner* — Steven Lim
*Assistant Examiner* — Mancil Littlejohn, Jr.
(74) *Attorney, Agent, or Firm* — Wenderoth, Lind & Ponack, L.L.P.

(57) ABSTRACT

A tactile sense presentation method includes arranging a plurality of first electrodes covered with an insulating film on a plane; arranging a plurality of second electrodes on a plane with tops exposed to outside; and performing a first operation in parallel with a second operation. The first operation is for applying temporally changing first voltages to a part of the plurality of first electrodes to generate electric fields which are changed by the part of the plurality of first electrodes. The second operation is for applying temporally changing first electric currents to a part of the plurality of second electrodes to cause the electric currents to flow from the part of the plurality of second electrodes to second electrodes which are different from the part of the plurality of second electrodes via electric conductors.

11 Claims, 22 Drawing Sheets

(51) Int. Cl.
*G06F 3/01* (2006.01)
*G06F 3/041* (2006.01)
*G06F 3/044* (2006.01)

(56) References Cited

U.S. PATENT DOCUMENTS

| | | | |
|---|---|---|---|
| 8,174,373 | B2 | 5/2012 | Makinen et al. |
| 8,212,783 | B2 | 7/2012 | Kim et al. |
| 8,330,590 | B2 | 12/2012 | Poupyrev et al. |
| 8,330,729 | B2 | 12/2012 | Tachi et al. |
| 8,570,163 | B2 | 10/2013 | Makinen et al. |
| 9,063,627 | B2 | 6/2015 | Yairi et al. |
| 2008/0129705 | A1 | 6/2008 | Kim et al. |
| 2009/0079550 | A1 | 3/2009 | Makinen et al. |
| 2009/0109007 | A1 | 4/2009 | Makinen et al. |
| 2009/0174671 | A1 | 7/2009 | Tachi et al. |
| 2010/0085169 | A1 | 4/2010 | Poupyrev et al. |
| 2011/0074733 | A1 | 3/2011 | Makinen et al. |
| 2011/0109588 | A1* | 5/2011 | Makinen ............. G09B 21/003 345/174 |
| 2011/0141052 | A1 | 6/2011 | Bernstein et al. |
| 2011/0254799 | A1 | 10/2011 | Makinen et al. |
| 2012/0062516 | A1* | 3/2012 | Chen .................. G06F 3/016 345/174 |
| 2012/0133645 | A1 | 5/2012 | Jung et al. |
| 2012/0242463 | A1 | 9/2012 | Makinen et al. |
| 2014/0146005 | A1* | 5/2014 | Hong .................. G06F 3/016 345/174 |
| 2014/0160063 | A1 | 6/2014 | Yairi et al. |
| 2014/0160064 | A1 | 6/2014 | Yairi et al. |
| 2014/0192005 | A1* | 7/2014 | Wakuda ............... G06F 3/041 345/173 |
| 2014/0225848 | A1* | 8/2014 | Ogura ................. G06F 3/041 345/173 |
| 2014/0240110 | A1* | 8/2014 | Suzuki ................ G06F 3/041 340/407.1 |
| 2014/0266649 | A1* | 9/2014 | Wakuda ............... G06F 3/041 340/407.2 |
| 2014/0293147 | A1 | 10/2014 | Tang et al. |
| 2014/0340210 | A1 | 11/2014 | Wakuda et al. |
| 2015/0149967 | A1 | 5/2015 | Bernstein et al. |

FOREIGN PATENT DOCUMENTS

| | | |
|---|---|---|
| JP | 2004-319255 | 11/2004 |
| JP | 2005-055489 | 3/2005 |
| JP | 2005-085048 | 3/2005 |
| JP | 2006-163206 | 6/2006 |
| JP | 2006-251948 | 9/2006 |
| JP | 2007-087239 | 4/2007 |
| JP | 2008-146649 | 6/2008 |
| JP | 2009-087359 | 4/2009 |
| JP | 2010-086471 | 4/2010 |
| JP | 2011-002926 | 1/2011 |
| JP | 2011-107879 | 6/2011 |
| JP | 2012-114920 | 6/2012 |
| WO | 2010/139171 | 12/2010 |

OTHER PUBLICATIONS

International Search Report issued Jul. 23, 2013 in International (PCT) Application No. PCT/JP2013/003616.
International Search Report issued Aug. 20, 2013 in International (PCT) Application No. PCT/JP2013/003617.
International Search Report issued Sep. 17, 2013 in International (PCT) Application No. PCT/JP2013/003870.
International Search Report issued Sep. 17, 2013 in International (PCT) Application No. PCT/JP2013/003871.
International Search Report issued Sep. 17, 2013 in International (PCT) Application No. PCT/JP2013/003872.
U.S. Office Action issued Jul. 31, 2015 in U.S. Appl. No. 14/241,701.
U.S. Office Action issued May 4, 2015 in corresponding U.S. Appl. No. 14/241,204.
International Preliminary Report on Patentability and Written Opinion of the International Searching Authority issued in International Application No. PCT/JP2013/003616 on Jan. 8, 2015.
International Preliminary Report on Patentability and Written Opinion of the International Searching Authority issued in International Application No. PCT/JP2013/003617 on Jan. 8, 2015.
International Preliminary Report on Patentability and Written Opinion of the International Searching Authority issued in International Application No. PCT/JP2013/003870 on Jan. 8, 2015.
International Preliminary Report on Patentability and Written Opinion of the International Searching Authority issued in International Application No. PCT/JP2013/003871 on Jan. 8, 2015.
International Preliminary Report on Patentability and Written Opinion of the International Searching Authority issued in International Application No. PCT/JP2013/003872 on Jan. 8, 2015.

* cited by examiner

Fig. 3
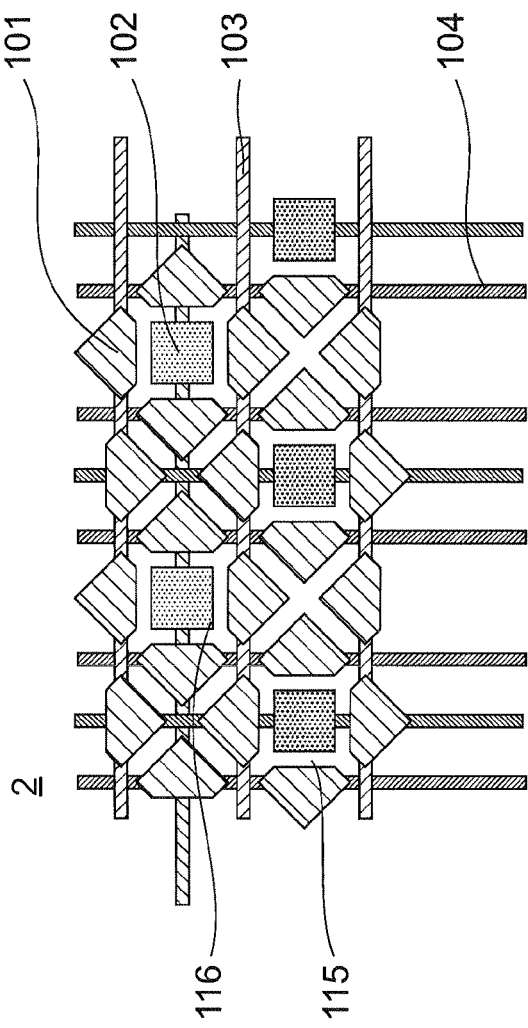
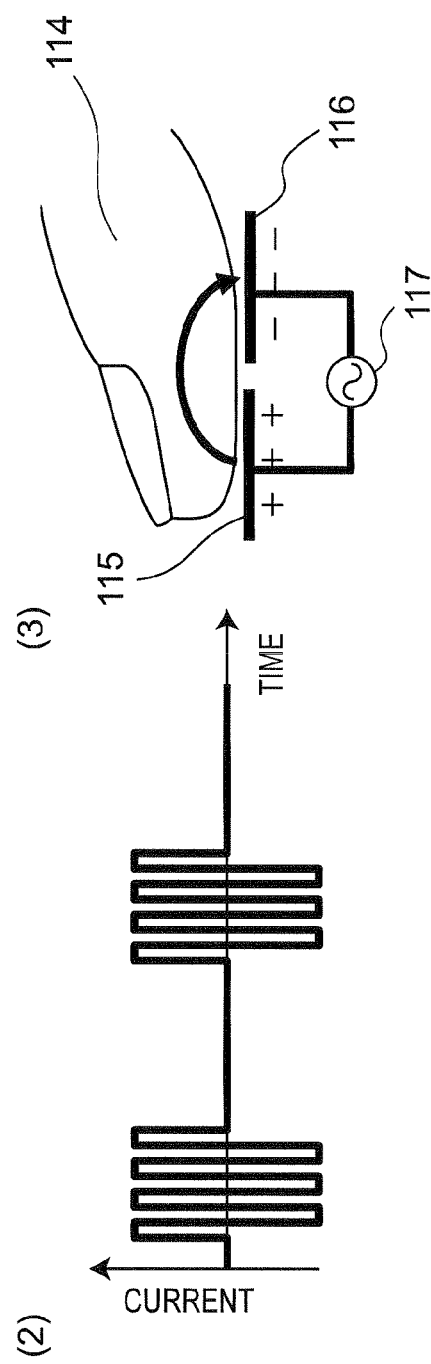

| ELECTRIC CURRENT TACTILE SENSE / TOUCH | | DIMENSIONLESS | TWO DIMENSION | |
|---|---|---|---|---|
| | | | PASSIVE | ACTIVE |
| DIMENSIONLESS | | — | — | — |
| TWO DIMENSION | PASSIVE | · SPACE SHARING | · SPACE SHARING | — |
| | ACTIVE | · SPACE SHARING<br>· TIME SHARING<br>(With TFT) | · SPACE SHARING<br>· TIME SHARING<br>(With TFT) | · SPACE SHARING<br>· TIME SHARING<br>(With TFT) |

(2)

| ELECTROSTATIC TACTILE SENSE / TOUCH | | DIMENSIONLESS | TWO DIMENSION | |
|---|---|---|---|---|
| | | | PASSIVE | ACTIVE |
| DIMENSIONLESS | | — | — | — |
| TWO DIMENSION | PASSIVE | · SPACE SHARING | · SPACE SHARING | — |
| | ACTIVE | · SPACE SHARING<br>· TIME SHARING<br>(With TFT) | · SPACE SHARING<br>· TIME SHARING<br>(With TFT) | · SPACE SHARING<br>· TIME SHARING<br>(With TFT) |

Fig. 8

| FUNCTION | | | | NUMBER | EXPOSED ELECTRODE | UNEXPOSED ELECTRODE | ELECTRODE |
|---|---|---|---|---|---|---|---|
| | ELECTRIC CURRENT TACTILE SENSE | TOUCH PANEL | ELECTROSTATIC TACTILE SENSE | | | | |
| SHARING MANNER OF ELECTRODES ON SAME PLANE | DEDICATED | SPACE SHARING | SPACE SHARING | (1) | ELECTRIC CURRENT TACTILE SENSE | ELECTROSTATIC TACTILE SENSE | FUNCTION SHARING |
| | | TIME SHARING | TIME SHARING | (2) | ELECTRIC CURRENT TACTILE SENSE | ELECTROSTATIC TACTILE SENSE | |
| | | SPACE SHARING and TIME SHARING | SPACE SHARING and TIME SHARING | (3) | ELECTRIC CURRENT TACTILE SENSE | ELECTROSTATIC TACTILE SENSE | |
| | SPACE SHARING | | DEDICATED | (4) | ELECTRIC CURRENT TACTILE SENSE+TOUCH PANEL | ELECTROSTATIC TACTILE SENSE | |
| | TIME SHARING | | | (5) | ELECTRIC CURRENT TACTILE SENSE+TOUCH PANEL | ELECTROSTATIC TACTILE SENSE | |
| | SPACE SHARING and TIME SHARING | | | (6) | ELECTRIC CURRENT TACTILE SENSE+TOUCH PANEL | ELECTROSTATIC TACTILE SENSE | |
| | SPACE SHARING | | SPACE SHARING | (7) | ELECTRIC CURRENT TACTILE SENSE+TOUCH PANEL | ELECTROSTATIC TACTILE SENSE+TOUCH PANEL | |
| | SPACE SHARING | | TIME SHARING | (8) | ELECTRIC CURRENT TACTILE SENSE+TOUCH PANEL | ELECTROSTATIC TACTILE SENSE+TOUCH PANEL | |
| | SPACE SHARING | | SPACE SHARING and TIME SHARING | (9) | ELECTRIC CURRENT TACTILE SENSE+TOUCH PANEL | ELECTROSTATIC TACTILE SENSE+TOUCH PANEL | |
| | TIME SHARING | | SPACE SHARING | (10) | ELECTRIC CURRENT TACTILE SENSE+TOUCH PANEL | ELECTROSTATIC TACTILE SENSE+TOUCH PANEL | |
| | TIME SHARING | | TIME SHARING | (11) | ELECTRIC CURRENT TACTILE SENSE+TOUCH PANEL | ELECTROSTATIC TACTILE SENSE+TOUCH PANEL | |
| | TIME SHARING | | SPACE SHARING and TIME SHARING | (12) | ELECTRIC CURRENT TACTILE SENSE+TOUCH PANEL | ELECTROSTATIC TACTILE SENSE+TOUCH PANEL | |
| | SPACE SHARING and TIME SHARING | | SPACE SHARING | (13) | ELECTRIC CURRENT TACTILE SENSE+TOUCH PANEL | ELECTROSTATIC TACTILE SENSE+TOUCH PANEL | |
| | SPACE SHARING and TIME SHARING | | TIME SHARING | (14) | ELECTRIC CURRENT TACTILE SENSE+TOUCH PANEL | ELECTROSTATIC TACTILE SENSE+TOUCH PANEL | |
| | SPACE SHARING and TIME SHARING | | SPACE SHARING and TIME SHARING | (15) | ELECTRIC CURRENT TACTILE SENSE+TOUCH PANEL | ELECTROSTATIC TACTILE SENSE+TOUCH PANEL | |
| | DEDICATED | | DEDICATED | (16) | ELECTRIC CURRENT TACTILE SENSE | ELECTROSTATIC TACTILE SENSE | |

Fig.9

| FUNCTION | ELECTRIC CURRENT TACTILE SENSE | TOUCH PANEL | ELECTROSTATIC TACTILE SENSE | NUMBER | EXPOSED ELECTRODE | UNEXPOSED ELECTRODE | ELECTRODE |
|---|---|---|---|---|---|---|---|
| SHARING MANNER OF ELECTRODES ON DIFFERENT PLANES | DEDICATED | SPACE SHARING | | (1) | ELECTRIC CURRENT TACTILE SENSE | ELECTROSTATIC TACTILE SENSE+TOUCH PANEL | FUNCTION SHARING |
| | | TIME SHARING | | (2) | ELECTRIC CURRENT TACTILE SENSE | ELECTROSTATIC TACTILE SENSE+TOUCH PANEL | |
| | | SPACE SHARING and TIME SHARING | | (3) | ELECTRIC CURRENT TACTILE SENSE | ELECTROSTATIC TACTILE SENSE+TOUCH PANEL | |
| | SPACE SHARING | | DEDICATED | (4) | ELECTRIC CURRENT TACTILE SENSE | ELECTROSTATIC TACTILE SENSE | |
| | TIME SHARING | | | (5) | ELECTRIC CURRENT TACTILE SENSE | ELECTROSTATIC TACTILE SENSE | |
| | SPACE SHARING and TIME SHARING | | | (6) | ELECTRIC CURRENT TACTILE SENSE | ELECTROSTATIC TACTILE SENSE | |
| | SPACE SHARING | | SPACE SHARING | (7) | ELECTRIC CURRENT TACTILE SENSE+TOUCH PANEL | ELECTROSTATIC TACTILE SENSE+TOUCH PANEL | |
| | SPACE SHARING | | TIME SHARING | (8) | ELECTRIC CURRENT TACTILE SENSE+TOUCH PANEL | ELECTROSTATIC TACTILE SENSE+TOUCH PANEL | |
| | SPACE SHARING | | SPACE SHARING and TIME SHARING | (9) | ELECTRIC CURRENT TACTILE SENSE+TOUCH PANEL | ELECTROSTATIC TACTILE SENSE+TOUCH PANEL | |
| | TIME SHARING | | SPACE SHARING | (10) | ELECTRIC CURRENT TACTILE SENSE+TOUCH PANEL | ELECTROSTATIC TACTILE SENSE+TOUCH PANEL | |
| | TIME SHARING | | TIME SHARING | (11) | ELECTRIC CURRENT TACTILE SENSE+TOUCH PANEL | ELECTROSTATIC TACTILE SENSE+TOUCH PANEL | |
| | TIME SHARING | | SPACE SHARING and TIME SHARING | (12) | ELECTRIC CURRENT TACTILE SENSE+TOUCH PANEL | ELECTROSTATIC TACTILE SENSE+TOUCH PANEL | |
| | SPACE SHARING and TIME SHARING | | SPACE SHARING | (13) | ELECTRIC CURRENT TACTILE SENSE+TOUCH PANEL | ELECTROSTATIC TACTILE SENSE+TOUCH PANEL | |
| | SPACE SHARING and TIME SHARING | | TIME SHARING | (14) | ELECTRIC CURRENT TACTILE SENSE+TOUCH PANEL | ELECTROSTATIC TACTILE SENSE+TOUCH PANEL | |
| | SPACE SHARING and TIME SHARING | | SPACE SHARING and TIME SHARING | (15) | ELECTRIC CURRENT TACTILE SENSE+TOUCH PANEL | ELECTROSTATIC TACTILE SENSE+TOUCH PANEL | |

Fig.10

| ELECTRIC CURRENT TACTILE SENSE PRESENTING ELECTRODE | DIMENSIONLESS | TWO DIMENSION ||
|---|---|---|---|
| | | PASSIVE | ACTIVE |

| ELECTROSTATIC TACTILE SENSE PRESENTING ELECTRODE | DIMENSIONLESS | TWO DIMENSION ||
|---|---|---|---|
| | | PASSIVE | ACTIVE |

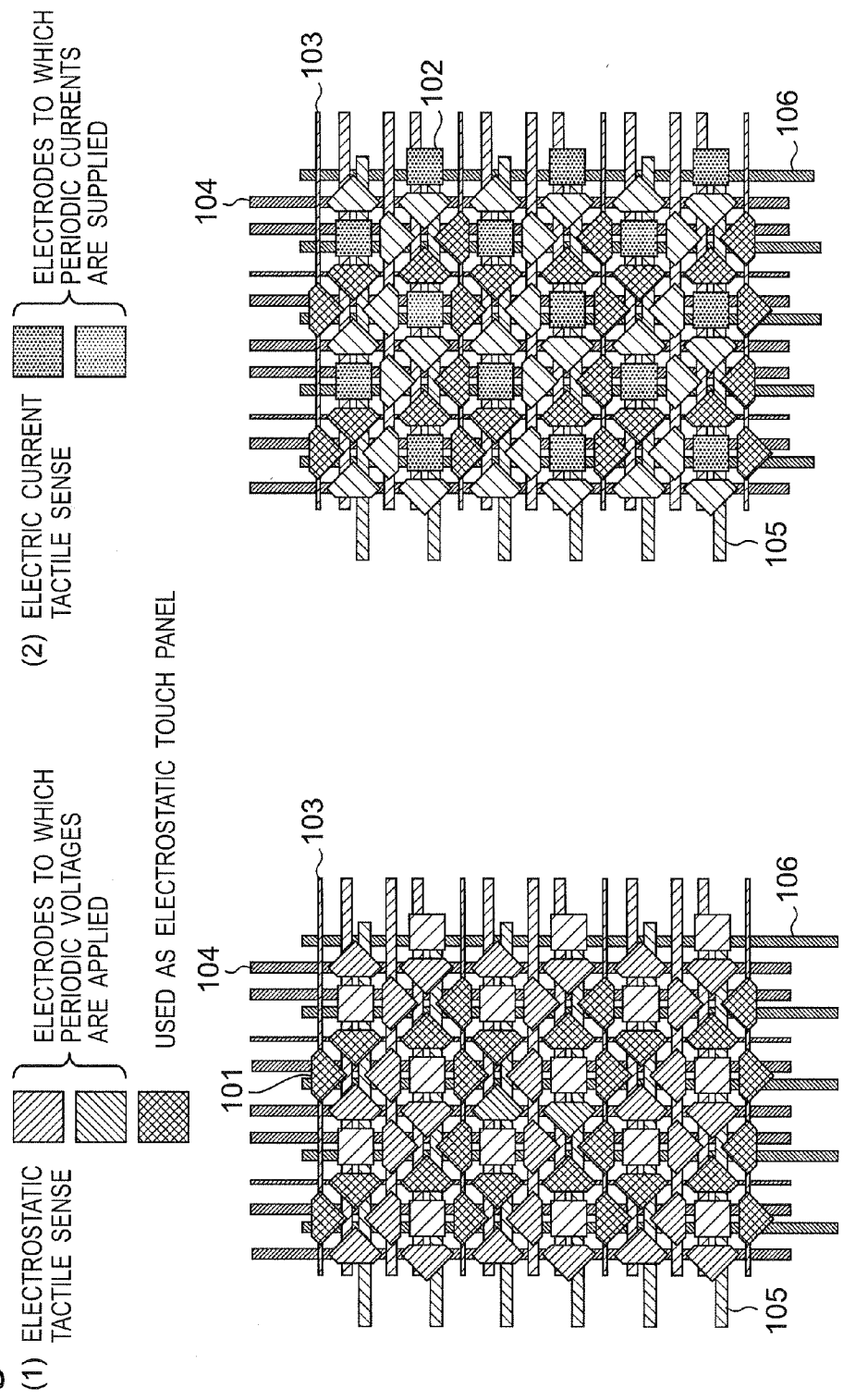

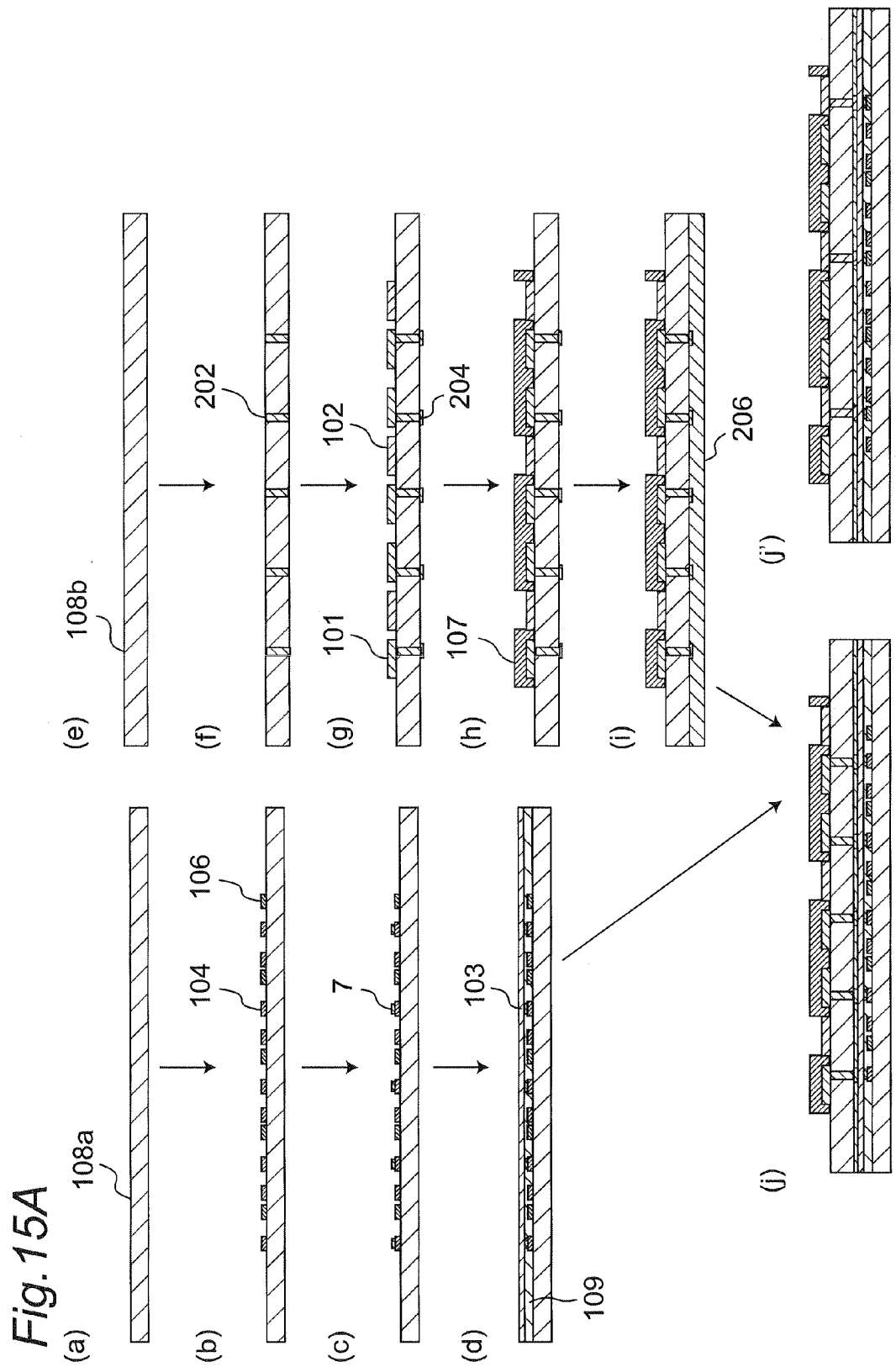

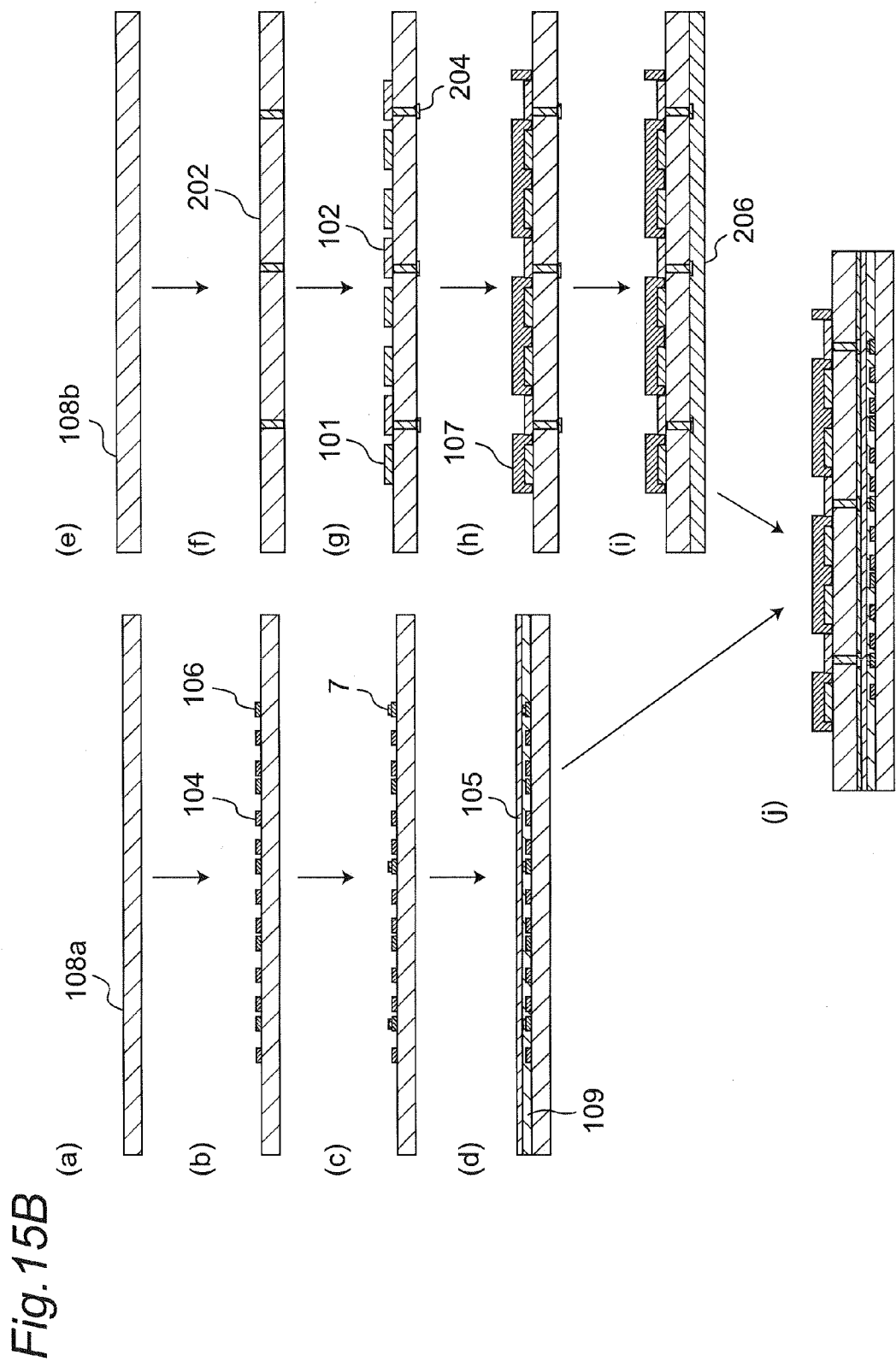

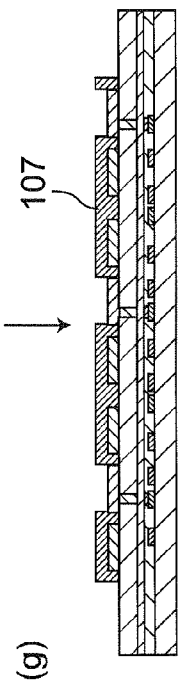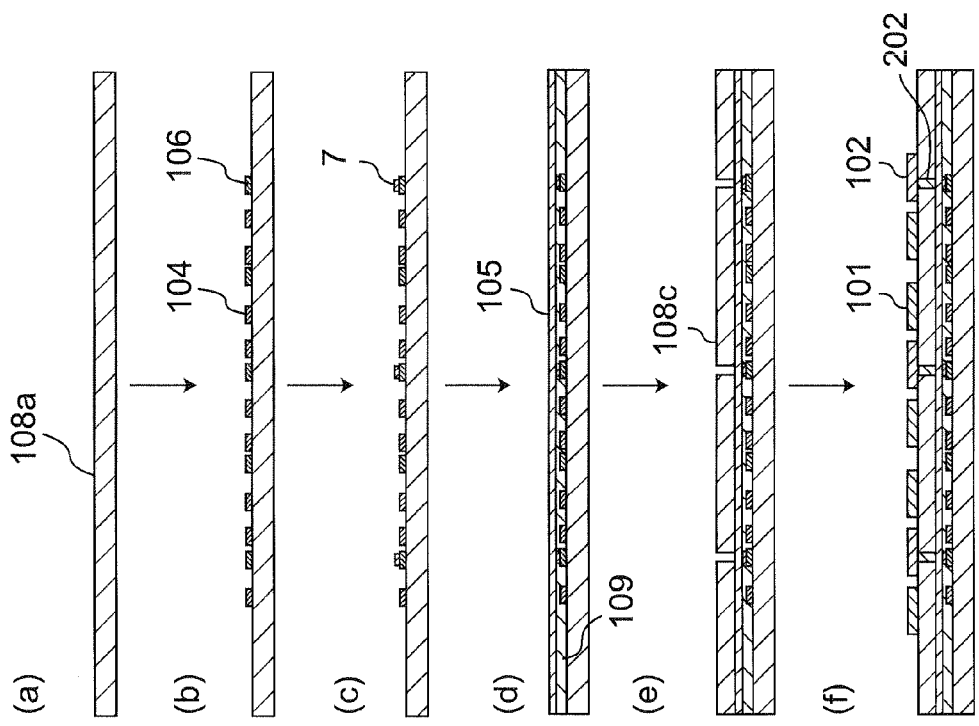
Fig. 16B

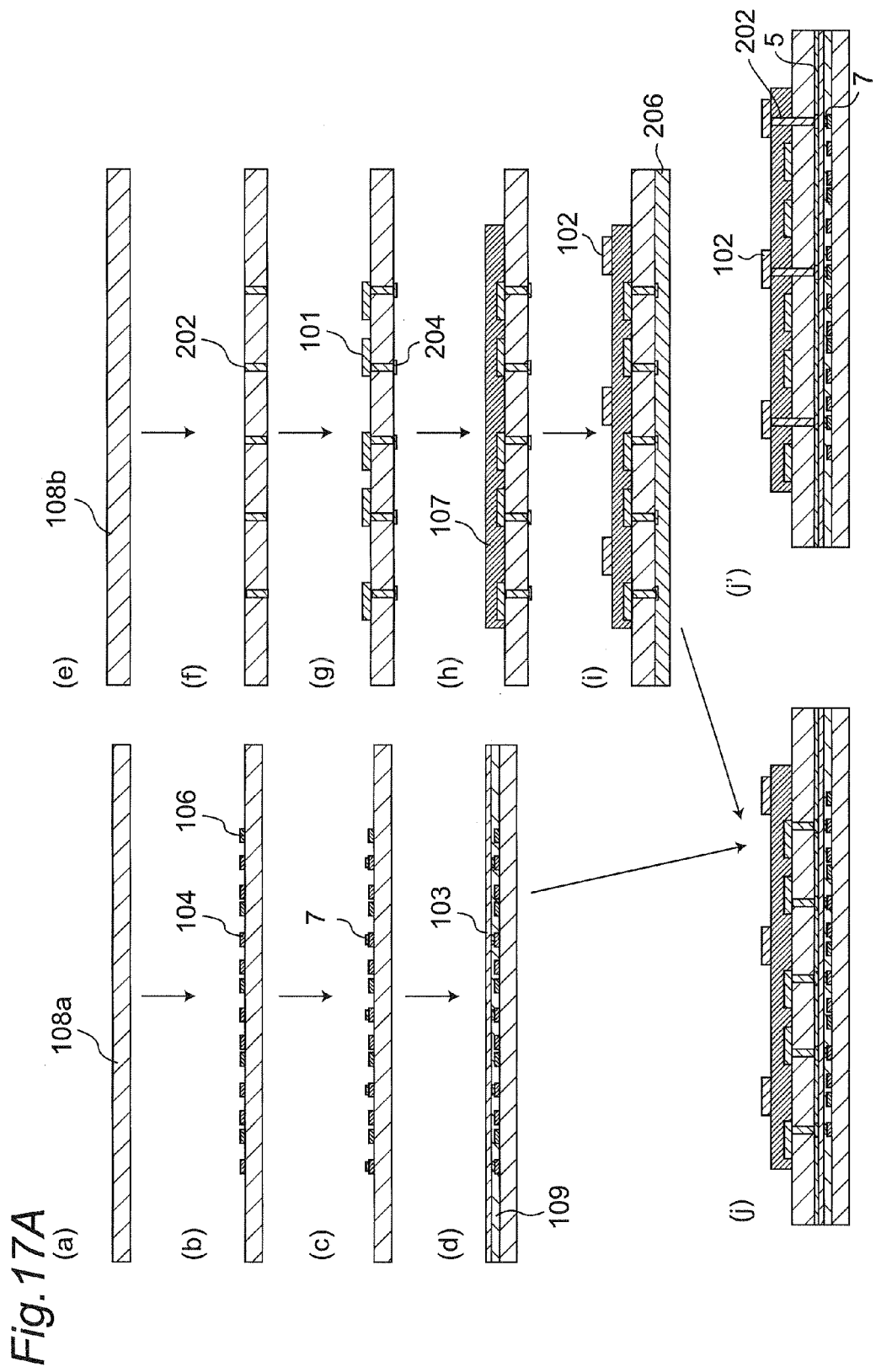

METHOD FOR PRESENTING TACTILE SENSATION AND DEVICE THEREFOR

TECHNICAL FIELD

The present disclosure relates to a method and a device for presenting a tactile sense to an operator.

BACKGROUND ART

It has been widely accepted to control touch-enabled operating devices such as cellular phones and game consoles by touching a specific area on a touch panel mounted on a liquid crystal screen with a finger or a stylus while viewing buttons and icons displayed on the screen.

However, the buttons and icons are merely displayed on the screen as images and are not presented as tangible and tactile objects. Therefore, the operators are required to visually recognize the displayed positions of the buttons and icons without having a real feeling of entering information such as pressure and the like the operators usually feels in pressing a tangible button.

The method and apparatus for sensory stimulation described in Patent Document 1 present a tactile sense to the operator by using an electrostatic force. The tactile sense presentation device and the drive method for the device described in Patent Document 2 present a tactile sense to the operator by directly applying an electrical stimulus to a skin surface.

PRIOR ART DOCUMENTS

Patent Documents

Patent Document 1: JP 2009-87359 A
Patent Document 2: JP 2005-85048 A

The method and apparatus for sensory stimulation described in Patent Document 1 form an electrode-finger-electrode circuit by generating different electric potentials in two plane electrodes arranged on the surface of the sensory stimulation apparatus and having a finger approach the electrodes. With the electrostatic force generated between the finger and the electrodes, the technology produces an imitational sensory stimulation. However, since the stimulation caused by the electrostatic force takes effect only on the finger surface, available tactile senses are limited.

The tactile sense presentation device and the drive method for the device described in Patent Document 2 present tactile sense information to the operator by having the operator place his finger on an electrode array and applying an electric current to the skin in contact with the electrode array to stimulate the sensory nerve on the finger. However, available tactile senses are limited also in the case of the stimulation caused by the electric current application.

SUMMARY OF THE INVENTION

The present disclosure is intended to solve the above described conventional problem, and it is an object of the invention to provide a tactile sense presentation device capable of presenting elaborate tactile senses both by using electric current stimulation to present a tactile sense and by using an electrostatic force to present a tactile sense.

The present invention is made for the purpose of solving the above problem. A tactile sense presentation method according to the present disclosure comprises:

arranging a plurality of first electrodes covered with an insulating film on a same plane;

arranging a plurality of second electrode on a same plane with tops exposed to outside; and performing a first operation in parallel with a second operation, wherein the first operation is for applying temporally changing first voltages to a part of the plurality of first electrodes to generate electric fields which are changed by the part of the plurality of first electrodes, and the second operation is for applying temporally changing first electric currents to a part of the plurality of second electrodes to cause the electric currents to flow from the part of the plurality of second electrodes to second electrodes which are different from the part of the plurality of second electrodes via electric conductors.

Effects of the Invention

The tactile sense presentation device according to the present disclosure is capable of presenting elaborate tactile senses by realizing both of tactile sense presentation based on electric current stimulation and tactile sense presentation based on an electrostatic force without decreasing the effect of the electrostatic tactile sense presentation which makes use of the electrostatic force.

BRIEF DESCRIPTION OF DRAWINGS

FIG. 1(2) is a longitudinal sectional view of the tactile sense presentation device illustrated in FIG. 1(1) taken along a line "A-A".

FIG. 2(2) is a diagram illustrating a drive waveform of a voltage generated by a voltage source; FIG. 2(3) is a local sectional view illustrating a state of the first electrodes of the tactile sense presentation device illustrated in FIG. 2(1) having a finger placed on a top.

FIG. 3(1) is a diagram illustrating an example of the tactile sense presentation device illustrated in FIG. 1(1) causing second electrodes to function as electric current tactile sense presenting electrodes; FIG. 3(2) is a diagram illustrating a drive waveform of an electric current generated by a current source; FIG. 3(3) is a local sectional view illustrating a state of the second electrodes of the tactile sense presentation device illustrated in FIG. 3(1) having a finger placed on a top.

FIG. 6(2) is a longitudinal sectional view of the tactile sense presentation device illustrated in FIG. 6(1) taken along a line "A-A".

FIG. 7(1) is a table showing combination patterns of electrodes which carry out both of an electric current tactile sense presenting function and a touch sensor function; FIG. 7(2) is a table showing combination patterns of electrodes which carry out both of an electrostatic tactile sense presenting function and a touch sensor function.

FIG. 8 is a table showing coexisting combinations of a set of electric current tactile sense presenting electrodes and touch sensor electrodes and a set of electrostatic tactile sense presenting electrodes and touch sensor electrodes, functions of which coexist in a space sharing manner or in a time sharing manner in the tactile sense presentation device as illustrated in FIG. 1 which has the electrostatic tactile sense presenting electrodes and the electric current tactile sense presenting electrodes arranged on a same plane.

FIG. 9 is a table showing coexisting combinations of a set of electric current tactile sense presenting electrodes and touch sensor electrodes and a set of electrostatic tactile sense presenting electrodes and touch sensor electrodes, functions of which coexist in a space sharing manner or in a time sharing manner in the tactile sense presentation device as illustrated in FIG. 6 which has the electrostatic tactile sense presenting electrodes and the electric current tactile sense presenting electrodes arranged on different planes.

FIG. 10 shows a table indicating that the electric current tactile sense presenting electrodes adopt a dimensionless matrix system, a passive matrix system, or an active matrix system, and a table indicating that the electrostatic tactile sense presenting electrodes adopt a dimensionless matrix system, a passive matrix system, or an active matrix system.

FIG. 12(2) is a diagram illustrating the second electrodes of the tactile sense presentation device illustrated in FIG. 11 operating as the electric current tactile sense presenting electrodes.

FIG. 14(1) is a diagram illustrating the first electrodes of the tactile sense presentation device illustrated in FIG. 13 operating as the touch sensor electrodes or the electrostatic tactile sense presenting electrodes; FIG. 14(2) is a diagram illustrating the second electrodes of the tactile sense presentation device illustrated in FIG. 13 operating as the electric current tactile sense presenting electrodes.

FIG. 15A illustrates an outline of a manufacturing method of the tactile sense presentation device which has the electrostatic tactile sense presenting electrodes and the electric current tactile sense presenting electrodes arranged on a same plane in which both of the electric current tactile sense presenting electrodes and the electrostatic tactile sense presenting electrodes function as dedicated electrodes.

FIG. 15B illustrates an outline of a manufacturing method of the tactile sense presentation device which has the electrostatic tactile sense presenting electrodes and the electric current tactile sense presenting electrodes arranged on a same plane in which both of the electric current tactile sense presenting electrodes and the electrostatic tactile sense presenting electrodes function as dedicated electrodes, different from FIG. 15A in a position taken for the cross section.

FIG. 16B illustrates an outline of a manufacturing method of the tactile sense presentation device which has the electrostatic tactile sense presenting electrodes and the electric current tactile sense presenting electrodes arranged on a same plane in which both of the electric current tactile sense presenting electrodes and the electrostatic tactile sense presenting electrodes function as dedicated electrodes, different from FIG. 16A in a position taken for the cross section.

FIG. 17A illustrates an outline of a manufacturing method of the tactile sense presentation device which has the electrostatic tactile sense presenting electrodes and the electric current tactile sense presenting electrodes arranged on different planes in which both of the electric current tactile sense presenting electrodes and the electrostatic tactile sense presenting electrodes function as dedicated electrodes.

DETAILED DESCRIPTION OF THE INVENTION

The method and apparatus for sensory stimulation described in Patent Document 1 enable tactile sense presentation based on an electrostatic force. On the other hand, the tactile sense presentation device and the drive method for the device described in Patent Document 2 enable tactile sense presentation based on electric current stimulation. On the condition that the tactile sense presentation based on electric current stimulation and the tactile sense presentation based on an electrostatic force by the apparatus, the device, and the methods are incorporated in a tactile sense presentation device, simultaneous presentation of these different tactile senses of an indirect tactile sense caused by an electrostatic force and a direct tactile sense caused by electric current stimulation would be enabled. However, on the condition that tactile sense presenting electrodes using electric current stimulation are formed in the tactile sense presentation device using an electrostatic force, a tactile sense presenting electrode layer using an electrostatic force would be arranged on the rear of a tactile sense presenting electrode layer using electric current stimulation across an insulating film. In that case, the effect of the electrostatic tactile sense presentation inevitably declines.

Then, the present disclosure provides a tactile sense presentation device capable of presenting elaborate tactile senses by realizing both of tactile sense presentation based on electric current stimulation and tactile sense presentation based on an electrostatic force without decreasing the effect of the electrostatic tactile sense presentation which makes use of the electrostatic force.

Embodiments of the present invention will be described below with reference to the drawings.

First Embodiment 1.1. Configuration of the Tactile Sense Presentation Device

Figure 1:
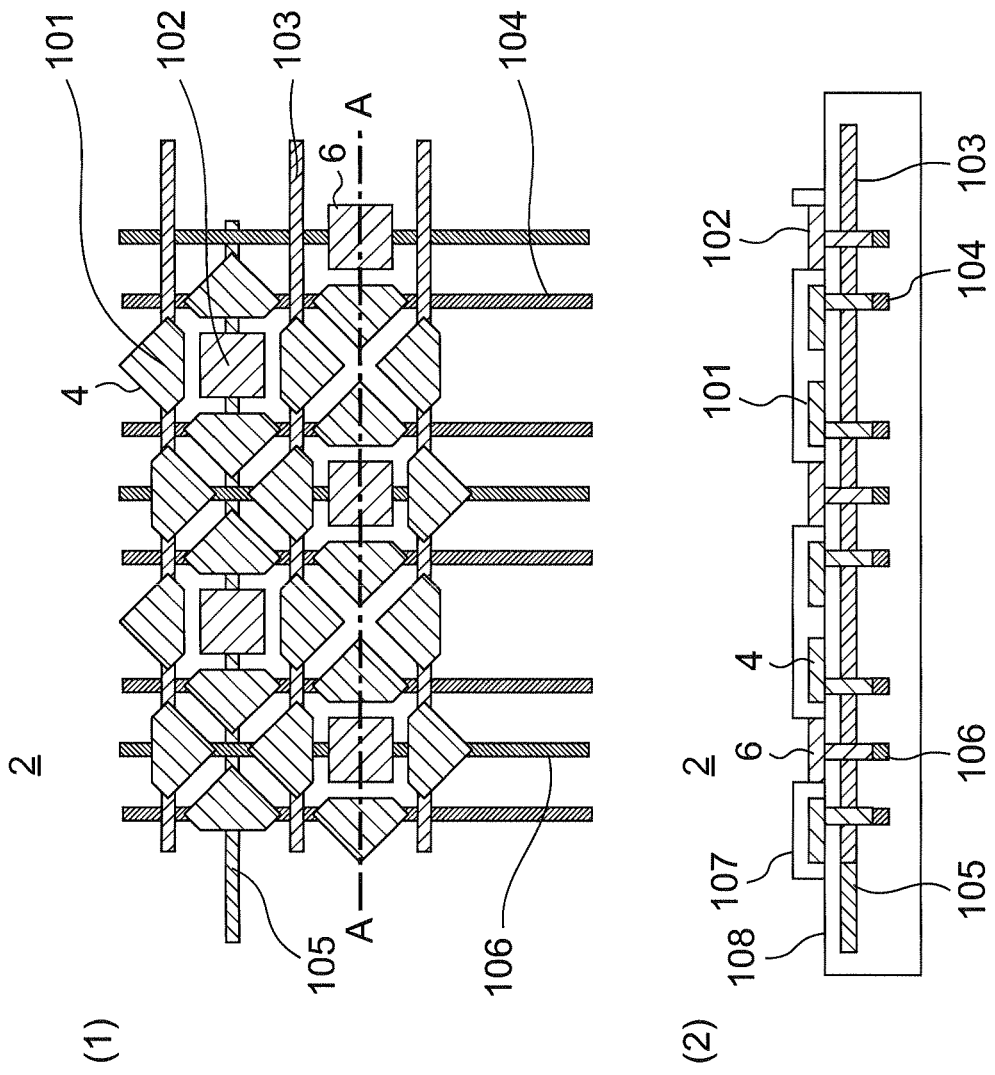
FIG. 1(1) is a plan view of a part of a tactile sense presentation device with a touch panel function according to a first embodiment of the present invention.

FIG. 1(1) is a plan view of a part of a tactile sense presentation device 2 with a touch panel function according to a first embodiment of the present invention, and FIG. 1(2) is a longitudinal sectional view of the tactile sense presentation device 2 illustrated in FIG. 1(1) taken along a line A-A.

In the tactile sense presentation device 2 illustrated in FIG. 1, first electrodes 101 are a plurality of electrostatic tactile sense presenting electrodes 4 made of ITO (indium tin oxide) of 100 nm in thickness arranged on a same plane. The first electrodes 101, each of which is a pentagon four of which occupy approximately three quarters of a square of side 0.8 mm, are laid out on a same plane at intervals of 1 mm between the centers of the squares and at intervals of 0.2 mm between the electrodes.

Second electrodes 102 are a plurality of electric current tactile sense presenting electrodes 6 made of ITO (indium tin oxide) of 100 nm in thickness arranged on the same plane. The second electrodes 102, each of which is a square of side 0.8 mm, are laid out on the same plane at intervals of 2 mm between the centers of the squares and at a distance of 0.2 mm from the first electrodes 101.

First extraction electrodes 103, which are arranged below the first electrodes 101, are a plurality of electrodes extracted in one direction of the plane. Second extraction electrodes 104, which are arranged below the first electrodes 101, are a plurality of electrodes extracted in a direction different from that of the first extraction electrodes 103. Both of the first and second extraction electrodes are made of ITO (indium tin oxide) of 100 nm in thickness and 50 μm in line width.

Third extraction electrodes 105, which are arranged below the second electrodes 102, are a plurality of electrodes extracted in one direction of the plane. Fourth extraction electrodes 106, which are arranged below the second electrodes 102, are a plurality of electrodes extracted in a direction different from that of the third extraction electrodes 105. Both of the third and fourth extraction electrodes are made of ITO (indium tin oxide) of 100 nm in thickness and 50 μm in line width.

An insulating film 107, which is an insulator made of glass arranged to cover the top of the first electrodes 101, is 1 μm thick on the surface of the first electrodes 101. A substrate 108 is an insulator made of glass in contact with the bottoms of the first electrodes 101 and the second electrodes 102.

The plurality of first electrodes 101 have their bottoms electrically connected with the first extraction electrodes 103 or the second extraction electrodes 104. Also, the plurality of second electrodes 102 have their bottoms electrically connected with the third extraction electrodes 105 or the fourth extraction electrodes 106.

As will be described below, the tactile sense presentation device 2 illustrated in FIG. 1(1) causes the first electrodes 101 to function as electrostatic tactile sense presenting electrodes, causes the second electrodes 102 to function as electric current tactile sense presenting electrodes, and further causes the first electrodes 101 to function as touch sensor electrodes.

The tactile sense presentation device 2 according to the embodiment adopts a passive matrix system. As a result, the tactile sense presentation device 2 can select the first electrodes 101 to be caused to function as the electrostatic tactile sense presenting electrodes from among the plurality of first electrodes 101 by the unit of the first extraction electrode 103 or by the unit of the second extraction electrode 104.

Also, the tactile sense presentation device 2 can select the second electrodes 102 to be caused to function as the electric current tactile sense presenting electrodes from among the plurality of second electrodes 102 by the unit of the third extraction electrode 105 or by the unit of the fourth extraction electrode 106.

Further, the tactile sense presentation device 2 can select the first electrodes 101 to be caused to function as the touch sensor electrodes from among the plurality of first electrodes 101 by the unit of the first extraction electrode 103 or by the unit of the second extraction electrode 104.

A control unit of the tactile sense presentation device 2 causes the first electrodes 101 to function as the electrostatic tactile sense presenting electrodes and the touch sensor electrodes in a time sharing manner. The control unit is implemented by a data processing unit to be described later.

It is needless to say that the size of the electrodes and the pitches to arrange the electrodes are merely examples and other sizes and pitches may be used.

1.2. Electrostatic Tactile Sense Presenting Operation of the Tactile Sense Presentation Device FIG. 2(1) is a diagram illustrating an example of the tactile sense presentation device 2 illustrated in FIG. 1(1) causing the first electrodes 101 to function as the electrostatic tactile sense presenting electrodes. In the tactile sense presentation device 2 illustrated in FIG. 2(1), a part of the first electrodes 101 are used as positive electrostatic interaction electrodes 111 whereas a part of the rest of the first electrodes 101 are used as negative electrostatic interaction electrodes 112. A prescribed voltage is applied to the positive electrostatic interaction electrodes 111.

Figure 2:
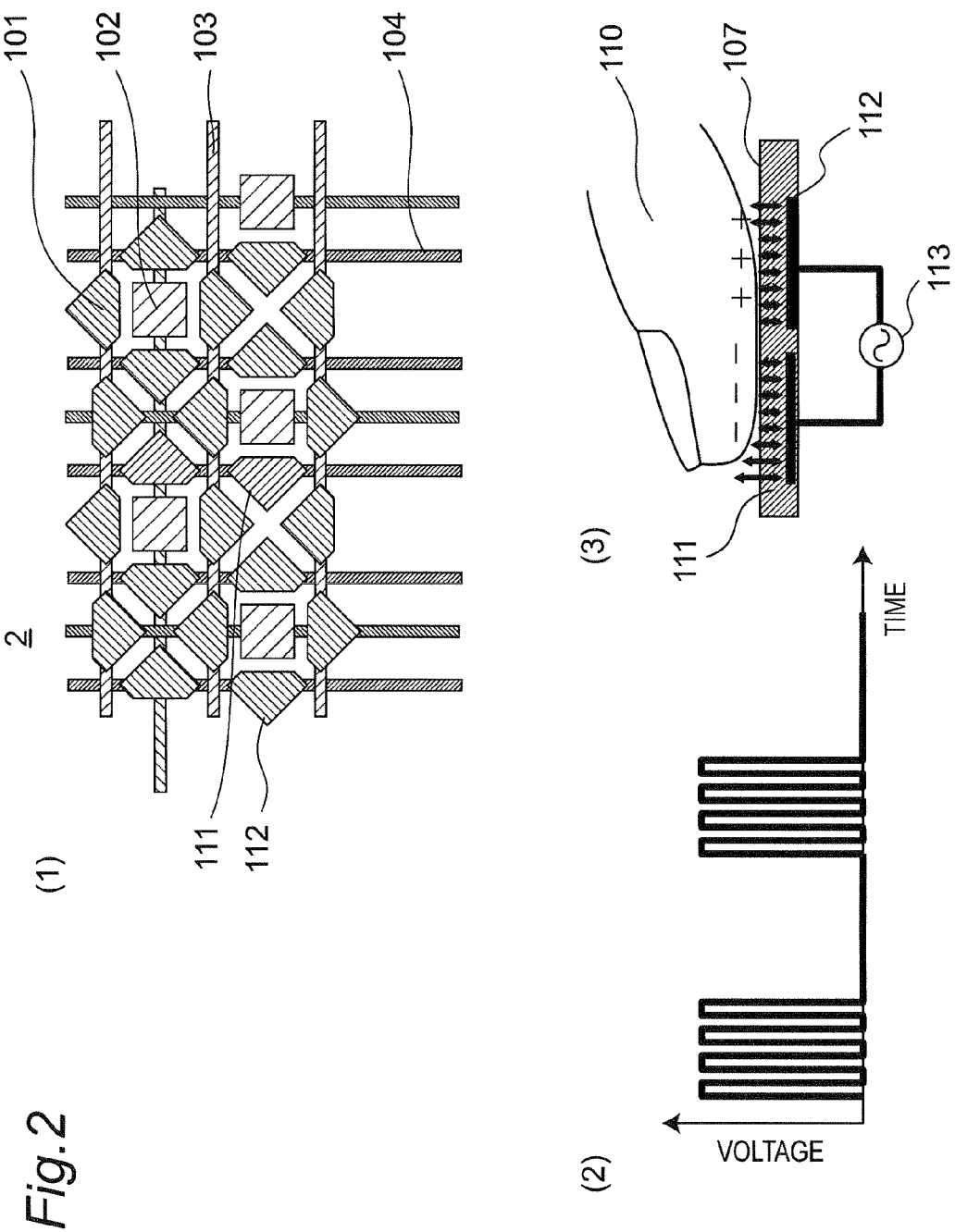
FIG. 2(1) is a diagram illustrating an example of the tactile sense presentation device illustrated in FIG. 1(1) causing first electrodes to function as electrostatic tactile sense presenting electrodes.

FIG. 2(3) is a local sectional view illustrating a state of the first electrodes 101 of the tactile sense presentation device 2 illustrated in FIG. 2(1) having a finger placed on the top. As illustrated in FIG. 2(3), since the insulating film 107 is formed to cover the top of the positive electrostatic interaction electrodes 111 and the negative electrostatic interaction electrodes 112, a dielectric 110 such as a human finger is placed on the insulating film 107. A voltage source 113 is configured between the positive electrostatic interaction electrodes 111 and the negative electrostatic interaction electrodes 112.

FIG. 2(2) is a diagram illustrating a drive waveform of a voltage generated by the voltage source 113. The voltage source 113 applies a positive voltage to the positive electrostatic interaction electrode 111 and a negative voltage to the negative electrostatic interaction electrode 112. In response to the application, an opposite electric fields are induced in the dielectric (finger) 110 across the insulating film 107. Specifically, a negative charge is induced in a part facing the positive electrostatic interaction electrode 111 and a positive charge is induced in a part facing the negative electrostatic interaction electrode 112. As a result, electrostatic forces are produced between one charge of the dielectric (finger) 110 and the positive electrostatic interaction electrode 111 and between another charge of the dielectric (finger) 110 and the negative electrostatic interaction electrode 112, so that the dielectric (finger) 110 experiences the electrostatic forces in the directions of the electrostatic interaction electrodes 111 and 112. As the voltage of the voltage source 113 temporally changes, the electrostatic force experienced by the dielectric (finger) 110 changes, and therefore, the dielectric (finger) 110 feels a vibration on its surface.

Usually, while a finger is being moved along a surface of an object, the finger catches a vibration from the roughness of the object surface and feels a tactile sense such as granularity or smoothness according to the strength and the frequency of the vibration. The tactile sense presentation device 2 can present imitational granularity or smoothness to the finger by making use of the above described electrostatic force to cause the finger to feel the vibration.

Specifically, in the case where 5 to 200 V is applied to the positive electrostatic interaction electrode 111 and 0 V is applied to the negative electrostatic interaction electrode 112 with the frequencies of 20 to 500 Hz, a granular feel can be presented. The higher the voltage is, the stronger the granularity is, and the lower the voltage is, the less strong the granularity is. In the case where the applied voltage is 0 to 5 V, no granularity is presented but such a tactile sense as glass-like smoothness can be presented. With low frequencies, a feel of coarse surface can be presented, and with high frequencies, a feel of fine surface is presented. As described above, with the voltages from 0 to 200 V and the frequencies from 0 to 500 Hz, the tactile sense presentation device 2 can express tactile senses from glass-like smoothness to granularity.

1.3. Electric Current Tactile Sense Presenting Operation of the Tactile Sense Presentation Device FIG. 3(1) is a diagram illustrating an example of the tactile sense presentation device 2 illustrated in FIG. 1(1) causing the second electrodes 102 to function as the electric current tactile sense presenting electrodes. In the tactile sense presentation device 2 illustrated in FIG. 3(1), a part of the second electrodes 102 are used as positive electric current interaction electrodes 115 whereas a part of the rest of the second electrodes 102 are used as negative electric current interaction electrodes 116. A prescribed electric current is supplied to the positive electric current interaction electrodes 115.

FIG. 3(3) is a local sectional view illustrating a state of the second electrodes 102 of the tactile sense presentation device 2 illustrated in FIG. 3(1) having a finger placed on the top. As illustrated in FIG. 3(3), an electric conductor 114 such as a human finger is placed to cover the top of the positive electric current interaction electrode 115 and the negative electric current interaction electrode 116. A current source 117 is configured between the positive electric current interaction electrode 115 and the negative electric current interaction electrode 116.

FIG. 3(2) is a diagram illustrating a drive waveform of an electric current generated by the current source 117. The current source 117 causes an electric current to flow from the positive electric current interaction electrode 115 to the negative electric current interaction electrode 116. That is, the electric current flows through the electric conductor, i.e., the finger 114. As a result, sensory nerves in the skin are directly stimulated. As the electric current of the current source 117 temporally changes, the stimulus experienced by the dielectric (finger) 114 changes, and therefore, the dielectric (finger) 114 feels a vibration.

Usually, while a finger is being moved along a stepped surface, the finger catches a vibration from the stepped part and feels a tactile sense of the sizes and the intervals of the steps according to the strength and the frequency of the vibration. The tactile sense presentation device 2 can present an imitational feel of roughness of steps by making use of the above described electric current stimulation to cause the finger to feel the vibration.

Specifically, in the case where an electric current 0 to 10 mA is applied between the positive electric current interaction electrode 115 and the negative electric current interaction electrode 116 with the frequency of 1 to 1200 Hz, a feel of roughness of steps can be presented. The larger the electric current is, the larger the felt step is, and the smaller the electric current is, the smaller the felt step is. In the case where the electric current is less than 0.5 mA, no step is felt and such a tactile sense as glass-like flatness can be presented. Therefore, with the electric currents from 0 to 10 mA and the frequencies from 1 to 1200 Hz, the tactile sense presentation device 2 can express tactile senses from a glass-like flatness feel to a feel of a stepped surface.

As described above, the electrostatic tactile sense presenting electrodes are capable of presenting feels of granularity and smoothness. On the other hand, the electric current tactile sense presenting electrodes are capable of presenting a feel of roughness of steps. The tactile sense presentation device according to the embodiment provided with a combination of a great number of these electrodes which are fine electrodes is capable of presenting elaborate tactile senses with mixed feels of granularity and roughness.

1.4. Touch Panel Operation of the Tactile Sense Presentation Device

Figure 4:
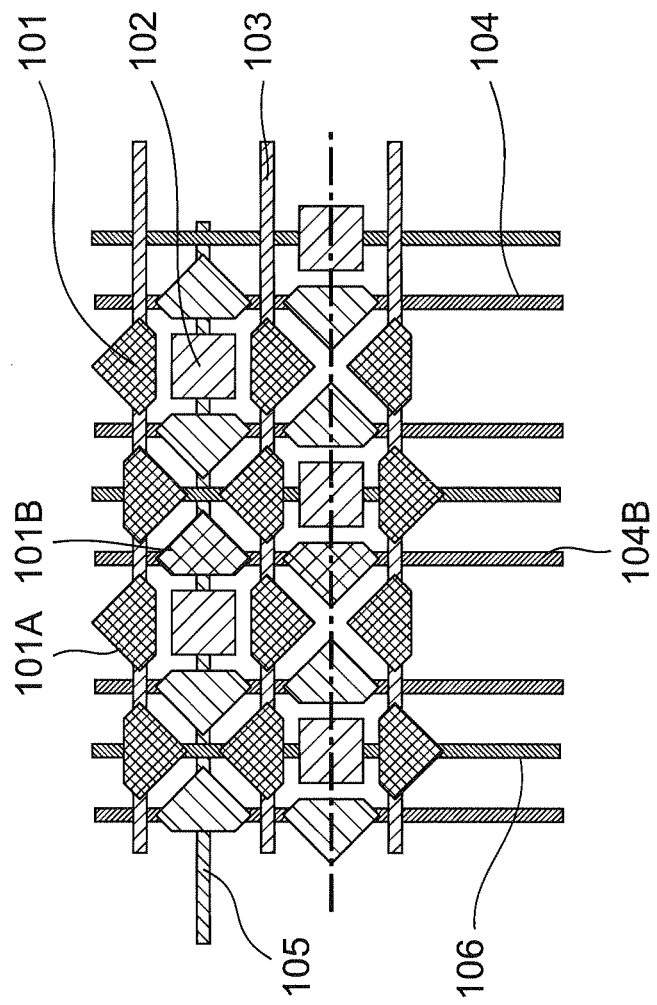
FIG. 4 is a diagram illustrating an example of the tactile sense presentation device illustrated in FIG. 1(1) causing the first electrodes to function as touch sensors.

FIG. 4 is a diagram illustrating an example of the tactile sense presentation device 2 illustrated in FIG. 1(1) causing the first electrodes 101 to function as touch sensor electrodes.

In the example illustrated in FIG. 4, the tactile sense presentation device 2 applies a drive voltage (touch drive) to a second extraction electrode 104B of the plurality of second extraction electrodes 104 to detect electric potentials of the respective first extraction electrodes 103 in order (touch sense). As a result, the first electrodes 101 which are electrically connected with the second extraction electrodes 104B among the plurality of first electrodes 101 operate as drive electrodes 101B, whereas the first electrodes 101 which are electrically connected with the first extraction electrodes 103 operate as sense electrodes 101A.

In the case where an alternating current signal, for example, is applied to the drive electrode 101B, alternating current signals according to the capacities between the drive electrode 101B and the sense electrodes 101A are derived from the first extraction electrodes 103. The electrostatic capacities between the drive electrode 101B and the sense electrodes 101A differ depending on whether or not the dielectric such as a human finger is at the places of the drive electrode 101B and the sense electrodes 101A. Therefore, the tactile sense presentation device 2 is capable of detecting the capacities between the drive electrode 101B and the sense electrodes 101A by applying the alternating voltage to the drive electrode 101B and measuring the waveforms of the sense electrodes 101A. Then, the tactile sense presentation device 2 is capable of detecting the presence or absence of the dielectric such as a human finger based on the capacities. Further, based on the positions of the driven second extraction electrode 104 and the first extraction electrodes 103 from which the signals are detected, the dielectric such as a human finger can be located. Further, the tactile sense presentation device 2 can sequentially change the first electrode 101 which is to be caused to function as the drive electrode 101B by sequentially changing the second extraction electrode 104 to which an alternating voltage is to be applied to, for example, the adjacent second extraction electrode 104. As a result, the tactile sense presentation device 2 which has the plurality of first electrodes 101 arranged on it can operate as a touch panel and detect the position of the dielectric such as a human finger in a touch surface of the touch panel.

1.5. Modifications of the Embodiment

In the present embodiment, the first electrodes 101 are configured to operate as the drive electrodes of a touch sensor, the sense electrodes of a touch sensor, the positive electrostatic interaction electrodes for tactile sense presentation, and the negative electrostatic interaction electrodes for tactile sense presentation. It is needless to say that the third extraction electrodes 105 and the fourth extraction electrodes 106 can be configured to cause the second electrodes 102 to operate as the drive electrodes of a touch sensor, the sense electrodes of a touch sensor, the positive electric current interaction electrodes for tactile sense presentation, and the negative electric current interaction electrodes for tactile sense presentation.

Although the first electrode 101 is assumed to be a pentagon in the embodiment, the shape of the first electrode 101 is not particularly limited and the first electrode 101 may be in any shape which forms an electrostatic capacity with a human finger or the like to make the first electrode 101 available for the electrostatic tactile sense presenting function or the touch panel function. For example, the first electrode 101 may be a square, a rectangle, a hexagon, or a round.

Although the second electrode 102 is assumed to be a square, the shape of the second electrode 102 is not particularly limited and the second electrode 102 may be in any shape which enables an electric current to flow through a human finger or the like to make the second electrode 102 available for the electric current tactile sense presenting function. For example, the second electrode 102 may be a rectangle, a hexagon, or a round.

Although the first electrodes 101, the second electrodes 102, the first extraction electrodes 103, the second extraction electrodes 104, the third extraction electrodes 105, and the fourth extraction electrodes 106 are assumed to be made of ITO of 100 µm in thickness, it is apparent that the electrodes may be made of any material which has an electrical conductance. For example, a metal oxide such as ZnO (zinc oxide), a metal such as Al, Cu, Ag, or Au, or a conductive organic material may be used other than ITO.

Although glass is used for the insulating film 107 and the substrate 108, the material is not particularly limited and any material may be used so far as it is an insulating material. For example, an organic insulator such as PET or polyimide may be used. Even in the case where the tactile sense presentation device with a touch panel function is arranged on the front side of an image display device such as a liquid crystal display, an organic electroluminescent display, or a plasma display, the tactile sense presentation device does not disturb the display function of the image display device, so far as the first electrodes 101, the second electrodes 102, the first extraction electrodes 103, the second extraction electrodes 104, the third extraction electrodes 105, the fourth extraction electrodes 106, and the insulating film 107 are made of a material "transparent" to visible light such as ITO, ZnO, or glass.

The term "transparent" here means a feature of allowing an image to be visible to the human eyes. Therefore, the material only needs to allow an image on the display to be visible to the human eyes even with low transmittance of light of wavelength within a visual light range.

Alternatively, a metal such as Ag or carbon fiber which are as fine as invisible to the human eyes, even if not transparent in a wavelength range of visible light, may be used for the first electrodes 101, the second electrodes 102, the first extraction electrodes 103, the second extraction electrodes 104, the third extraction electrodes 105, and the fourth extraction electrodes 106.

Although the insulating film 107 covering the first electrodes 101 is 1 µm thick in the embodiment, the thickness is not limited to that.

In the case where a temporally changing voltage is applied between the positive electrostatic interaction electrodes 111 and the negative electrostatic interaction electrodes 112 and the dielectric (finger) 110 is in the vicinity of the surface of the insulating film 107, the amount of change Δf/S of the electrostatic force per unit area that is applied by the first electrodes 101 to the dielectric (finger) 110 is represented by the expression 1 below.

$$\frac{\Delta f}{S} \propto \frac{\varepsilon_r \varepsilon_0 \Delta V^2}{h^2} \qquad \text{[Expression 1]}$$

In the expression 1, Δf is the amount of change of the force experienced by the dielectric (finger) 101, S is a projected area of the dielectric (finger) 110 on a plane formed by the first electrodes 101, i.e., an area of capacity made by the dielectric (finger) 101 and the first electrodes 101, $\varepsilon_r$ is a relative permittivity of the insulating film 107, $\varepsilon_0$ is a permittivity in vacuum, ΔV is the maximum value of a potential difference between the first electrodes 101 and the dielectric (finger) 110 (which is a potential difference between the positive electrostatic interaction electrode 111 and the negative electrostatic interaction electrode 112, and also a temporal amount of change of the potential of the positive electrostatic interaction electrode 111 (the negative electrostatic interaction electrode 112), and h is a distance between the first electrodes 101 and the dielectric (finger) 110. Since the dielectric (finger) 110 is in contact with the surface of the insulating film 107 when the operator is using the tactile sense presentation device 2, h is the thickness of the insulating film 107 in the surface side of the first electrodes 101. It is understood from the expression 1 that the amount of force change per unit area Δf/S is in proportion to the square of the voltage difference ΔV and in inverse proportion to the square of the thickness h of the insulating film 107. In the embodiment, the tactile sense presenting function is realized with the insulating film 107 of 1 µm in thickness and the voltage ΔV of 0 to 200 V. As far as ΔV/h>5[V/µm] is satisfied, an enough amount of force change per unit area Δf/S is achieved. For example, in the case where the insulating film 107 is 10 µm in thickness, the tactile sense presenting function is realized with the voltage ΔV in the range of 50 V or more.

1.6. Summarization

The tactile sense presentation device according to the embodiment has the electrostatic tactile sense presenting electrodes and the electric current tactile sense presenting electrodes arranged on the same plane. As a result, the tactile sense presentation device according to the embodiment is capable of presenting elaborate tactile senses as a result of realizing both of tactile sense presentation based on electric current stimulation and tactile sense presentation based on an electrostatic force without decreasing the effect of the electrostatic tactile sense presentation.

Second Embodiment 2.1. Configuration and Operation in an Active Matrix System

The tactile sense presentation device 2 with a touch panel function according to the first embodiment of the present invention adopts a passive matrix system. As a result, the tactile sense presentation device 2 selects the first electrodes 101 to be caused to function as the electrostatic tactile sense presenting electrodes from among the plurality of first electrodes 101 by the unit of the first extraction electrode 103 or by the unit of the second extraction electrode 104. Further, the tactile sense presentation device 2 with a touch panel function according to the first embodiment selects the first electrodes 101 to be caused to function as the touch sensor electrodes from among the plurality of first electrodes 101 by the unit of the first extraction electrode 103 or by the unit of the second extraction electrode 104. Still further, the control unit of the tactile sense presentation device 2 according to the first embodiment causes the first electrodes 101 to function as the electrostatic tactile sense presenting electrodes and the touch sensor electrodes in a time sharing manner.

In contrast, a tactile sense presentation device 2 with a touch panel function according to a second embodiment of the present invention adopts an active matrix system. That is, a control unit of the tactile sense presentation device 2 according to the second embodiment causes the first electrodes 101 to function as the electrostatic tactile sense presenting electrodes and the touch sensor electrodes in a time sharing manner in the active matrix system. The tactile sense presentation device 2 with a touch panel function according to the second embodiment will be described below by focusing on points different from the tactile sense presentation device 2 with a touch panel function according to the first embodiment.

Figure 5:
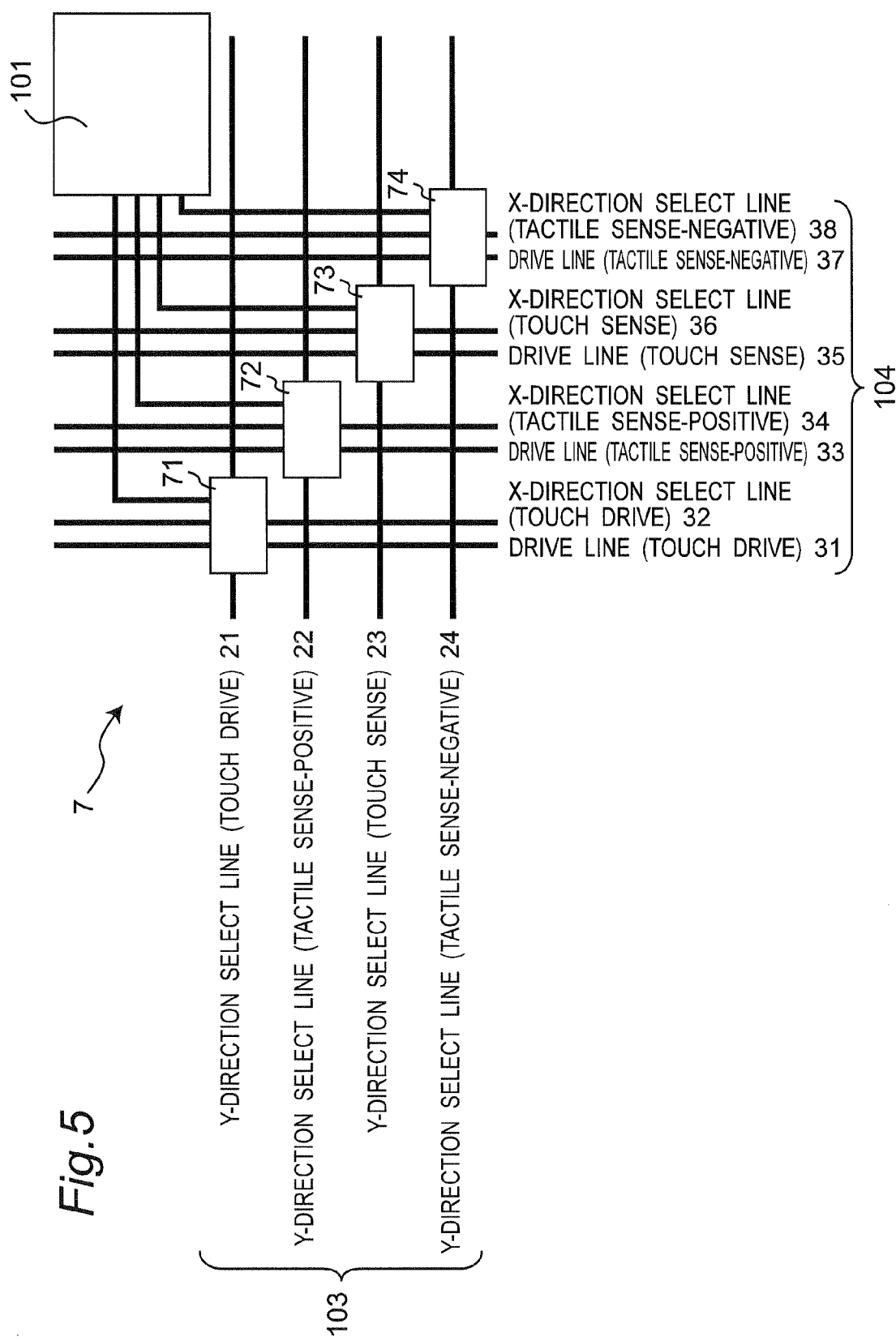
FIG. 5 is a diagram illustrating a configuration of a first electrode of a tactile sense presentation device with a touch panel function according to a second embodiment of the present invention.

FIG. 5 is a diagram illustrating a configuration of a first electrode 101 of the tactile sense presentation device 2 with a touch panel function according to the second embodiment. First extraction electrodes 103 and second extraction electrodes 104 are connected with the first electrode 101 of the tactile sense presentation device 2 according to the second embodiment illustrated in FIG. 5. Further, as illustrated in FIG. 5, both of the first extraction electrodes 103 and the second extraction electrodes 104 contain a plurality of signal lines. The plurality of signal lines are connected with semiconductor circuits 71 to 74.

The control unit of the tactile sense presentation device 2 according to the second embodiment causes the first electrodes 101 to function as the electrostatic tactile sense presenting electrodes and the touch sensor electrodes in a time sharing manner by using the above described first extraction electrodes 103, second extraction electrodes 104, and semiconductor circuits 71 to 74.

Configurations of the first extraction electrode 103, the second extraction electrode 104, and the semiconductor circuits 71 to 74 according to the second embodiment will be described.

In the embodiment, the first extraction electrode 103 includes four select lines of a Y-direction select line (touch drive) 21, a Y-direction select line (tactile sense-positive) 22, a Y-direction select line (touch sense) 23, and a Y-direction select line (tactile sense-negative) 24.

The second extraction electrode 104 includes eight conductor lines of a drive line (touch drive) 31, an X-direction select line (touch drive) 32, a drive line (tactile sense-positive) 33, an X-direction select line (tactile sense-positive) 34, a drive line (touch sense) 35, an X-direction select line (touch sense) 36, a drive line (tactile sense-negative) 37, and an X-direction select line (tactile sense-negative) 38. Semiconductor circuits 7 include the four same semiconductor circuits 71 to 74.

The semiconductor circuit 71 is arranged at the intersection point of the X-direction select line (touch drive) 32, the drive line (touch drive) 31, and the Y-direction select line (touch drive) 21. The semiconductor circuit 72 is arranged at the intersection point of the X-direction select line (tactile sense-positive) 34, the drive line (tactile sense-positive) 33, and the Y-direction select line (tactile sense-positive) 22. The semiconductor circuit 73 is arranged at the intersection point of the X-direction select line (touch sense) 36, the drive line (touch sense) 35, and the Y-direction select line (touch sense) 23. The semiconductor circuit 74 is arranged at the intersection point of the X-direction select line (tactile sense-negative) 38, the drive line (tactile sense-negative) 37, and the Y-direction select line (tactile sense-negative) 24. The respective semiconductor circuits 71 to 74 are connected with the first electrode 101.

As a result of turning ON one of the semiconductor circuits 71 to 74 illustrated in FIG. 5 associated with a predetermined function, the first electrode 101 can be caused to function as any of a drive electrode 101B of a touch sensor, a sense electrode 101A of a touch sensor, a positive electrostatic interaction electrode 111 for tactile sense presentation, and a negative electrostatic interaction electrode 112 for tactile sense presentation.

Specifically, a case where the first electrode 101 is caused to function as the drive electrode 101B of a touch sensor will be described. First, the X-direction select line (touch drive) 32 and the Y-direction select line (touch drive) 21 corresponding to the first electrode 101 which is to be caused to function as the drive electrode 101B of a touch sensor are set to ON voltages, so that the semiconductor circuit 71 at the intersection point of the select lines 21 and 32 is charged. Next, the X-direction select line (tactile sense-positive) 34, the X-direction select line (touch sense) 36, the X-direction select line (tactile sense-negative) 38 are set to ON voltages, then the Y-direction select line (tactile sense-positive) 22, the Y-direction select line (touch sense) 23, and the Y-direction select line (tactile sense-negative) 24 are set to OFF voltages, so that the semiconductor circuits 72, 73, and 74 are discharged. As a result, the voltage of the drive line (touch drive) 31 appears at the first electrode 101, and the voltage of the first electrode 101 becomes independent of the voltages of the drive line (tactile sense-positive) 33, the drive line (touch sense) 35, and the drive line (tactile sense-negative) 37.

Further, by recharging or discharging the semiconductor circuits 71 to 74 by using the corresponding first extraction electrodes 103 and second extraction electrodes 104 after a certain time period, the tactile sense presentation device 2 can cause the respective first electrodes 101 to have different functions.

In the above example, the semiconductor circuit 71 among the semiconductor circuits 71 to 74 has been described. As for the semiconductor circuit 73, the tactile sense presentation device 2 can lead the charge and the potential appearing at the first electrode 101 to the control unit via the drive line 35 by causing the semiconductor circuit 73 to operate in the same manner as the semiconductor circuit 71. Further, as for the semiconductor circuit 72, the tactile sense presentation device 2 can apply the drive voltage for tactile sense presentation (tactile sense-positive) from the control unit to the first electrode 101 via the drive line 33 by causing the semiconductor circuit 72 to operate in the same manner as the semiconductor circuit 71. Still further, as for the semiconductor circuit 74, the tactile sense presentation device 2 can apply the drive voltage for tactile sense presentation (tactile sense-negative) from the control unit to the first electrode 101 via the drive line 37 by causing the semiconductor circuit 74 to operate in the same manner as the semiconductor circuit 71.

In the configuration illustrated in FIG. 5, the four semiconductor circuits 71 to 74 are connected with the single first electrode 101. The tactile sense presentation device 2 is configured to cause each one of the first electrodes 101 to operate as any of the drive electrode of a touch sensor, the sense electrode of a touch sensor, the positive electrostatic interaction electrode for tactile sense presentation, and the negative electrostatic interaction electrode for tactile sense presentation in a time sharing manner. However, each of the first electrodes 101 is not necessarily required to function as all of the four kinds of electrodes. For example, the tactile sense presentation device 2 may cause half of the plurality of first electrodes 101 to function as the drive electrodes of a touch sensor and the positive electrostatic interaction electrodes for tactile sense presentation, and cause the other half to function as the sense electrodes of a touch sensor and the negative electrostatic interaction electrodes for tactile sense presentation. In that case, the plurality of first electrodes 101, as a whole, are caused to function as the touch sensor and the tactile sense presentation device. Therefore, since only two of the semiconductor circuits 71 are required for the single first electrode 101, reduction in the area and the cost of the semiconductor circuits 71 can be achieved.

The tactile sense presentation device 2 determines whether the first electrode 101 is to be function as the touch sensor or as the tactile sense presentation device based on the signal given to the first electrode 101. In the embodiment, the signal given to the first electrode 101 is switched by the four semiconductor circuits 71 to 74 provided below the first electrode 101. However, the present embodiment is not limited to that. For example, the signal given to the first electrode 101 may be switched in the control unit. In that case, it is no longer required to provide the four semiconductor circuits 71 to 74 for the single first electrode 101. That is, it is required to provide only one semiconductor circuit to control whether a drive voltage or the like supplied from the control unit is given to the first electrode 101. As a result, reduction in the area and the cost of the semiconductor circuits 7 can be achieved.

2.1. Modifications of the Embodiment

In the present embodiment, the first electrodes 101 are configured to operate as the drive electrodes of a touch sensor, the sense electrodes of a touch sensor, the positive electrostatic interaction electrodes for tactile sense presentation, and the negative electrostatic interaction electrodes for tactile sense presentation. It is needless to say that the third extraction electrodes 105 and the fourth extraction electrodes 106 can be configured to cause the second electrodes 102 to operate as the drive electrodes of a touch sensor, the sense electrodes of a touch sensor, the positive electric current interaction electrodes for tactile sense presentation, and the negative electric current interaction electrodes for tactile sense presentation.

Third Embodiment

Figure 6:
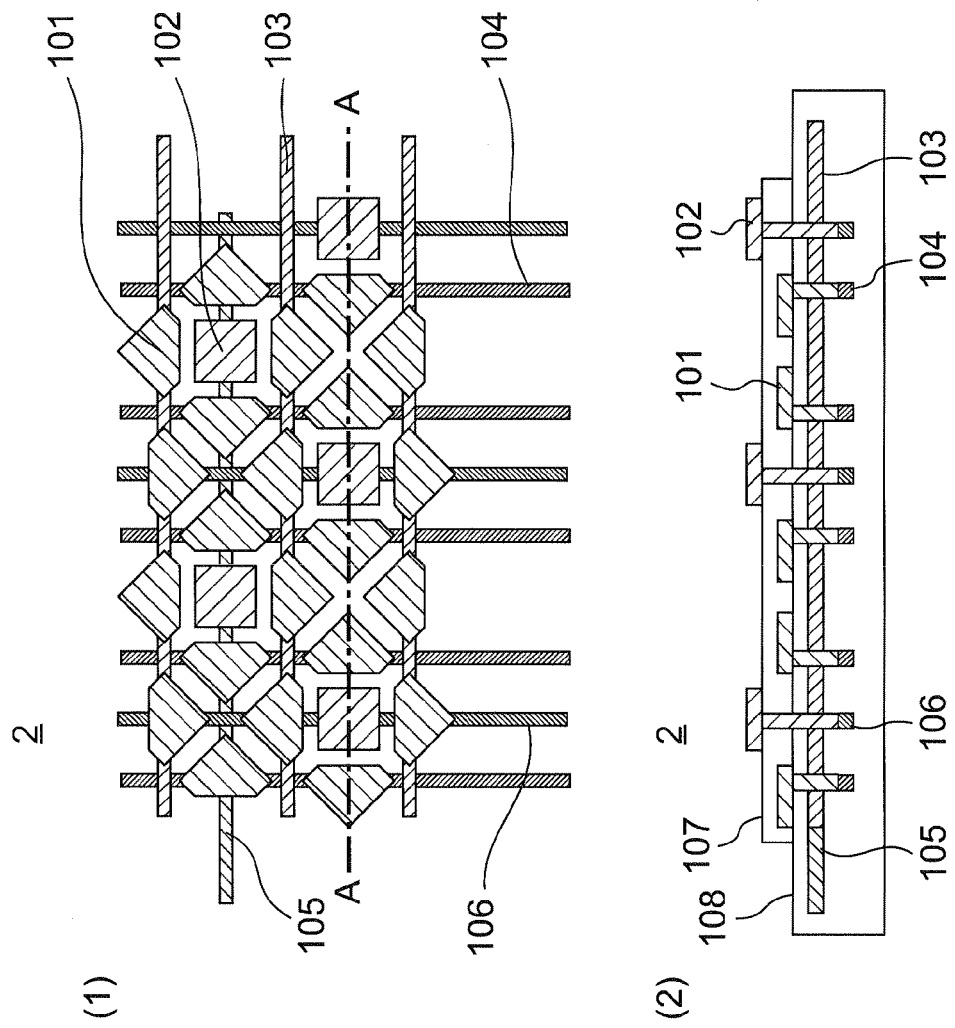
FIG. 6(1) is a plan view of a part of a tactile sense presentation device with a touch panel function according to a third embodiment of the present invention.

FIG. 6(1) is a plan view of a part of a tactile sense presentation device 2 with a touch panel function according to a third embodiment of the present invention, and FIG. 6(2) is a longitudinal sectional view of the tactile sense presentation device 2 illustrated in FIG. 6(1) taken along a line A-A.

As illustrated in FIGS. 1 and 6, the tactile sense presentation device with a touch panel function according to the third embodiment has almost the same configuration as that of the tactile sense presentation device with a touch panel function according to the first embodiment. In contrast to the tactile sense presentation device with a touch panel function according to the first embodiment which has the first electrodes 101 and the second electrodes 102 arranged on the same plane, the tactile sense presentation device with a touch panel function according to the third embodiment has first electrodes 101 and second electrodes 102 arranged on different planes.

Specifically, in the tactile sense presentation device 2 according to the third embodiment illustrated in FIG. 6(2), firstly, a plurality of first electrodes (electrostatic tactile sense presenting electrodes) 101 are arranged on the top of a substrate 108. An insulating film 107 is arranged to cover the plurality of first electrodes (electrostatic tactile sense presenting electrodes) 101 and the substrate 108. Further, the second electrodes (electric current tactile sense presenting electrodes) 102 are arranged on the top of the insulating film 107.

The tactile sense presentation device 2 according to the third embodiment is the same as the tactile sense presentation device according to the first embodiment in that first extraction electrodes 103, which are arranged below the first electrodes 101, are a plurality of electrodes extracted in one direction of the plane and second extraction electrodes 104, which are arranged below the first electrodes 101, are a plurality of electrodes extracted in a direction different from that of the first extraction electrodes 103.

Also, the tactile sense presentation device 2 according to the third embodiment is the same as the tactile sense presentation device according to the first embodiment in that third extraction electrodes 105, which are arranged below the second electrodes 102, are a plurality of electrodes extracted in one direction of the plane and forth extraction electrodes 106, which are arranged below the second electrodes 102, are a plurality of electrodes extracted in a direction different from that of the third extraction electrodes 105.

Further, the tactile sense presentation device 2 according to the third embodiment is the same as the tactile sense presentation device according to the first embodiment also in that the plurality of first electrodes 101 have their bottoms electrically connected with the first extraction electrodes 103 or the second extraction electrodes 104 and the plurality of second electrodes 102 have their bottoms electrically connected with the third extraction electrodes 105 or the fourth extraction electrodes 106.

A manufacturing method of the tactile sense presentation device 2 with a touch panel function according to the third embodiment will be described later.

The tactile sense presentation device 2 with a touch panel function according to the third embodiment has almost the same configuration as that of the tactile sense presentation device with a touch panel function according to the first embodiment and operates as a passive matrix tactile sense presentation device with a touch panel function.

Further, with an appropriate configuration of the first extraction electrodes 103, the second extraction electrodes 104, the third extraction electrodes 105, the fourth extraction electrodes 106, and semiconductor circuits 71 to 74 (not shown), the tactile sense presentation device 2 with a touch panel function according to the third embodiment illustrated in FIG. 6 can be made to operate as an active matrix tactile sense presentation device with a touch panel function.

Fourth Embodiment

As described in the first to third embodiments, the electrostatic tactile sense presenting electrodes and the electric current tactile sense presenting electrodes in the tactile sense presentation device can be adapted to a passive matrix system and also can be adapted to an active matrix system. Further, as shown in FIG. 10, the electrostatic tactile sense presenting electrodes and the electric current tactile sense presenting electrodes also can be adapted to a dimensionless matrix system. Here, the dimensionless matrix system refers to a system for causing the same voltage or the same electric current to be applied to all of the electrodes to make each of the electrodes present the same tactile sense.

As described in the first to third embodiments, also the touch sensor electrodes in the tactile sense presentation device with a touch panel function can be adapted to a passive matrix system and also can be adapted to an active matrix system.

Further, the electrodes (the first electrodes 101 and the second electrodes 102) according to the first to third embodiments have both of the functions of the tactile sense presenting electrodes and the touch sensor electrodes. Although it has been described that the tactile sense presenting electrode function and the touch sensor electrode function are switched in a time sharing manner in the first to third embodiments, the tactile sense presenting electrodes and the touch sensor electrodes may be arranged in a space sharing manner. FIG. 7(1) is a table showing combination patterns of electrodes which carry out both of an electric current tactile sense presenting function and a touch sensor function, and FIG. 7(2) is a table showing combination patterns of electrodes which carry out both of an electrostatic tactile sense presenting function and a touch sensor function. As illustrated in FIGS. 7(1), 7(2), and 10, the tactile sense presenting electrodes can be adapted to a dimensionless matrix system, a passive matrix system, and an active matrix system. The touch sensor electrodes can be adapted to a passive matrix system and an active matrix system.

As illustrated in FIGS. 7(1) and 7(2), among the electrodes which carry out both of the tactile sense presenting electrode function and the touch sensor electrode function, the tactile sense presenting electrodes and the touch sensor electrodes can be arranged in a space sharing manner. In the case where either of the tactile sense presenting electrodes and the touch sensor electrodes are adapted to the active matrix system, each of the electrodes needs to have a semiconductor circuit (TFT) 7. In the case where the electrodes are adapted to the active matrix system as described above, the tactile sense presenting electrode function and the touch sensor electrode function may be provided for each of the electrodes in a time sharing manner.

4.1. Combinations of the Electrostatic Tactile Sense Presenting Electrodes and the Electric Current Tactile Sense Presenting Electrodes Arranged on the Same Plane of the Tactile Sense Presentation Device FIG. 8 is a table showing sharing combinations of a set of the electric current tactile sense presenting electrodes and the touch sensor electrodes and a set of the electrostatic tactile sense presenting electrodes and the touch sensor electrodes, the functions of which coexist in a space sharing manner or in a time sharing manner in the tactile sense presentation device as illustrated in FIG. 1 which has the electrostatic tactile sense presenting electrodes and the electric current tactile sense presenting electrodes arranged on the same plane.

For example, the number (1) in FIG. 8 indicates a combination of the electric current tactile sense presenting electrodes which function as dedicated electrodes and a set of the electrostatic tactile sense presenting electrodes and the touch sensor electrodes the functions of which coexist with each other in a space sharing manner. The entry for "exposed electrode" indicates that the electric current tactile sense presenting electrodes are exposed, and the entry for "unexposed electrode" indicates that the voltage (electrostatic) tactile sense presenting electrodes which also serve as the touch sensor electrodes are unexposed (i.e., covered with an insulating film).

For example, the number (3) in FIG. 8 indicates a combination of the electric current tactile sense presenting electrodes which function as dedicated electrodes and a set of the electrostatic tactile sense presenting electrodes and the touch sensor electrodes the functions of which coexist with each other in a space sharing manner or in a time sharing manner in the tactile sense presentation device.

For example, the number (6) in FIG. 8 indicates a combination of the electrostatic tactile sense presenting electrodes which function as dedicated electrodes and a set of the electric current tactile sense presenting electrodes and the touch sensor electrodes the functions of which coexist with each other in a space sharing manner or in a time sharing manner in the tactile sense presentation device.

For example, the number (9) in FIG. 8 indicates a combination of a set of the electric current tactile sense presenting electrodes and the touch sensor electrodes the functions of which coexist with each other in a space sharing manner and a set of the electrostatic tactile sense presenting electrodes and the touch sensor electrodes the functions of which coexist with each other in a space sharing manner or in a time sharing manner in the tactile sense presentation device.

For example, the number (12) in FIG. 8 indicates a combination of a set of the electric current tactile sense presenting electrodes and the touch sensor electrodes the functions of which coexist with each other in a time sharing manner and a set of the electrostatic tactile sense presenting electrodes and the touch sensor electrodes the functions of which coexist with each other in a space sharing manner or in a time sharing manner in the tactile sense presentation device.

For example, the number (15) in FIG. 8 indicates a combination of a set of the electric current tactile sense presenting electrodes and the touch sensor electrodes the functions of which coexist with each other in a space sharing manner or in a time sharing manner and a set of the electrostatic tactile sense presenting electrodes and the touch sensor electrodes the functions of which coexist with each other in a space sharing manner or in a time sharing manner in the tactile sense presentation device.

For example, the number (16) in FIG. 8 indicates a combination of the electric current tactile sense presenting electrodes which function as dedicated electrodes and the electrostatic tactile sense presenting electrodes which function as dedicated electrodes in the tactile sense presentation device. In the last combination, the tactile sense presentation device does not have a touch panel function.

4.2. Combinations of the Electrostatic Tactile Sense Presenting Electrodes and the Electric Current Tactile Sense Presenting Electrodes Arranged on Different Planes of the Tactile Sense Presentation Device FIG. 9 is a table showing sharing combinations of a set of the electric current tactile sense presenting electrodes and the touch sensor electrodes and a set of the electrostatic tactile sense presenting electrodes and the touch sensor electrodes, the functions of which coexist in a space sharing manner or in a time sharing manner in the tactile sense presentation device as illustrated in FIG. 6 which has the electrostatic tactile sense presenting electrodes and the electric current tactile sense presenting electrodes arranged on different planes.

The table shown in FIG. 9 is almost the same as the table shown in FIG. 8 except that the table shown in FIG. 9 does not contain a combination of the electric current tactile sense presenting electrodes which function as dedicated electrodes and the electrostatic tactile sense presenting electrodes which function as dedicated electrodes in the tactile sense presentation device.

Figure 11:
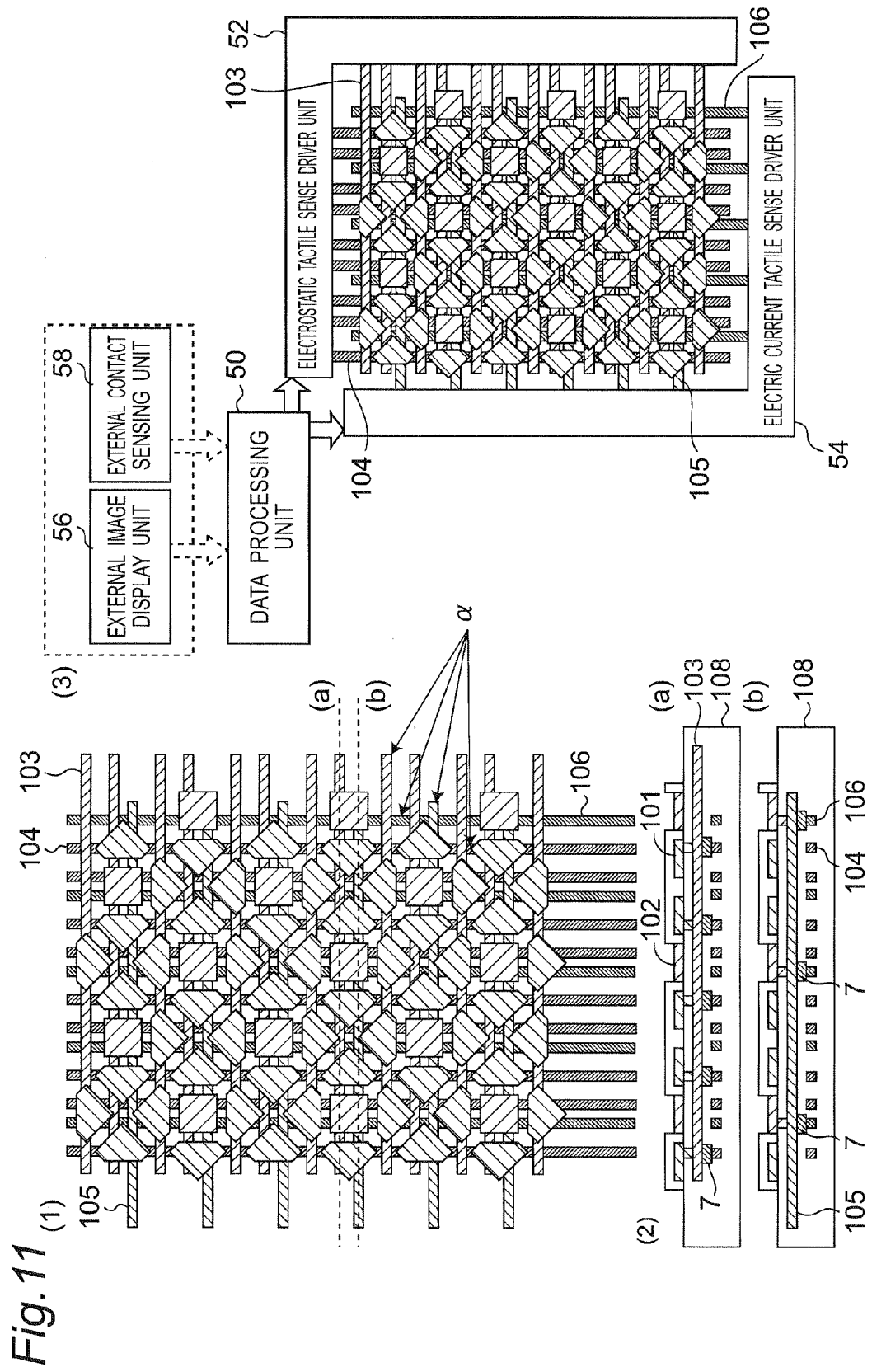
FIG. 11 is a diagram illustrating a configuration of the tactile sense presentation device which realizes a combination example of the tactile sense presenting electrodes.

4.3.1. Combination Example (1) of the Tactile Sense Presenting Electrodes in the Tactile Sense Presentation Device FIG. 11 is a diagram illustrating a configuration of the tactile sense presentation device which realizes a combination example of the tactile sense presenting electrodes. The tactile sense presentation device illustrated in FIG. 11 realizes the combination of the number (16) shown in FIG. 8 and adopts the active matrix system shown in FIG. 10. That is, the first electrodes 101 are only used as the electrostatic tactile sense presenting electrodes whereas the second electrodes 102 are only used as the electric current tactile sense presenting electrodes. FIG. 11(1) is a plane view illustrating a configuration of first electrodes 101, second electrodes 102, first extraction electrodes 103, second extraction electrodes 104, third extraction electrodes 105, and fourth extraction electrodes 106 of the tactile sense presentation device. FIG. 11(2) is longitudinal sectional views of the tactile sense presentation device illustrated in FIG. 11(1) taken along lines (a) and (b). FIG. 11(3) is a block diagram of the tactile sense presentation device including a data processing unit 50, an electrostatic tactile sense driver unit 52, and an electric current tactile sense driver unit 54.

As illustrated in FIGS. 11(1) and 11(2), semiconductor circuits (TFT) 7 are provided below the first electrodes 101 and the second electrodes 102. As also illustrated in FIG. 5, the first extraction electrodes 103, the second extraction electrodes 104, the third extraction electrodes 105, and the fourth extraction electrodes 106 contain a plurality of signal lines (see arrows from α). Further, as illustrated in FIG. 11(3), the first extraction electrodes 103 and the second extraction electrodes 104 are connected with the electrostatic tactile sense driver unit 52, and the third extraction electrodes 105 and the fourth extraction electrodes 106 are connected with the electric current tactile sense driver unit 54. Therefore, the data processing unit 50 controls signals to be given to the first electrodes 101 through the first extraction electrodes 103 and the second extraction electrodes 104 by the electrostatic tactile sense driver unit 52. The data processing unit 50 also controls signals to be given to the second electrodes 102 through the third extraction electrodes 105 and the fourth extraction electrodes 106 by the electric current tactile sense driver unit 54.

The data processing unit 50 is a control unit for controlling respective components which configure the tactile sense presentation device and external devices by processing the input signals and data and outputting respective control signals and control data. The data processing unit 50 realizes the respective functions by executing on a processor programs for realizing the functions according to the embodiment. The data processing unit 50 may be implemented by a hard-wired device capable of providing functions according to the embodiment.

Meanwhile, as illustrated in FIG. 11(3), the data processing unit 50 also processes data related with an external image display unit 56. Therefore, the tactile sense presentation device illustrated in FIG. 11 can be used in combination with the external image display unit 56.

Further, as illustrated in FIG. 11(3), the data processing unit 50 also processes data related with an external contact sensing unit 58. The external contact sensing unit 58 is an external touch sensor device which has a contact position detection unit for detecting a position of an approaching part of the body of the operator on the tactile sense presentation device. With that function, the tactile sense presentation device is capable of outputting an electric signal only to electrodes corresponding to the part of the body in contact with the tactile sense presentation device. The aspect can reduce the power consumption without reducing the amount of information presented by the tactile sense.

The contact position detection unit in the external contact sensing unit 58 may be implemented by a scanning mechanism which scans the tactile sense presentation device in a plane direction to detect the contact position. The scanning mechanism may include an XY laser scanner which detects a contact position based on a change in a laser beam. Further, the contact position detection unit in the external contact sensing unit 58 may be implemented by a detection mechanism which detects a contact position based on a change in a physical property of a section for presenting the tactile sense or may nclude a pressure sensor which detects a contact position based on a change in pressure on the section for presenting the tactile sense.

Figure 12:
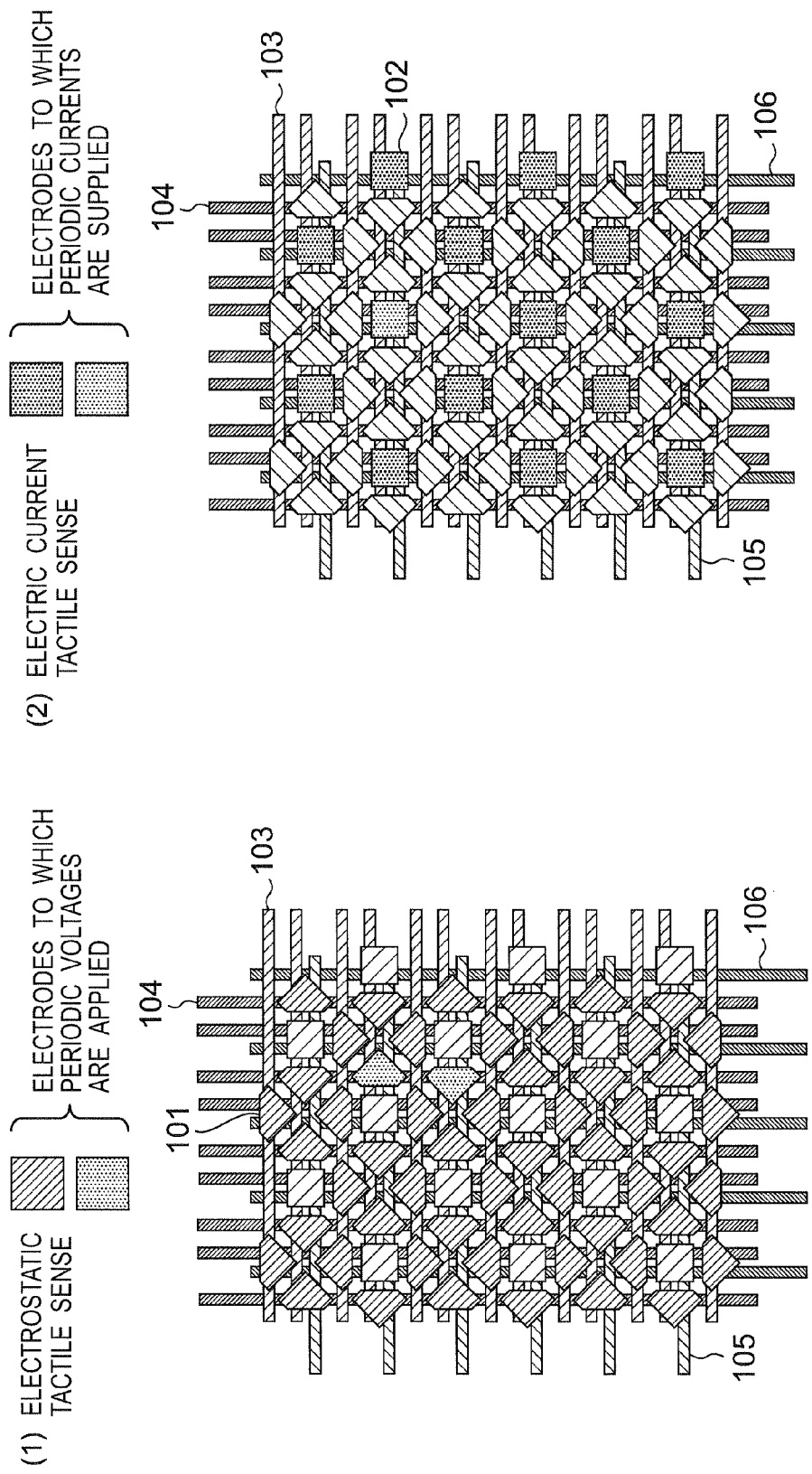
FIG. 12(1) is a diagram illustrating the first electrodes of the tactile sense presentation device illustrated in FIG. 11 operating as the electrostatic tactile sense presenting electrodes.

FIG. 12(1) is a diagram illustrating the first electrodes 101 of the tactile sense presentation device illustrated in FIG. 11 operating as the electrostatic tactile sense presenting electrodes. FIG. 12(2) is a diagram illustrating the second electrodes 102 of the tactile sense presentation device illustrated in FIG. 11 operating as the electric current tactile sense presenting electrodes.

In the tactile sense presentation device illustrated in FIG. 12(1), a periodic voltage is applied between the hatched first electrodes 101 and the first electrodes 101 filled with dots. Therefore, on the condition that a dielectric (finger) is placed between these electrodes 101, a tactile sense of granularity can be given to the dielectric (finger).

In the tactile sense presentation device illustrated in FIG. 12(2), a periodic electric current is supplied between the second electrodes 102 which are filled with fine dots and the second electrodes 102 which are filled with coarse dots. Therefore, on the condition that an electric conductor (finger) is placed between these electrodes 102, a tactile sense of roughness can be given to the electric conductor (finger).

Figure 13:
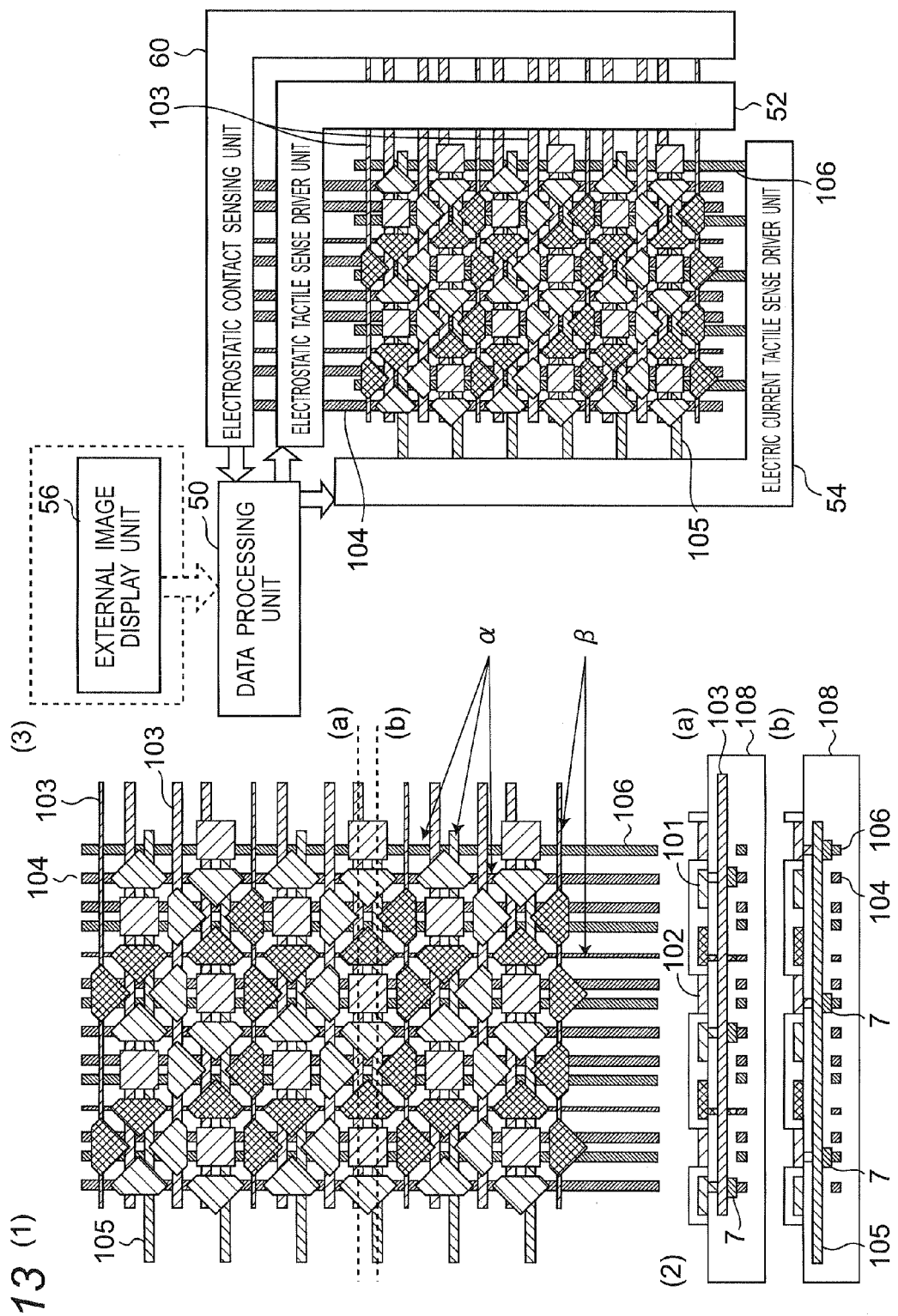
FIG. 13 is a diagram illustrating a configuration of the tactile sense presentation device which realizes a combination example of the tactile sense presenting electrodes.

4.3.2. Combination Example (2) of the Tactile Sense Presenting Electrodes in the Tactile Sense Presentation Device FIG. 13 is a diagram illustrating a configuration of the tactile sense presentation device which realizes a combination example of the tactile sense presenting electrodes. The tactile sense presentation device illustrated in FIG. 13 realizes the combination of the number (3) shown in FIG. 8 and adopts the active matrix system shown in FIG. 10. That is, the first electrodes 101 are used as the electrostatic tactile sense presenting electrodes or the touch sensor electrodes in a space sharing manner or in a time sharing manner whereas the second electrodes 102 are only used as the electric current tactile sense presenting electrodes. FIG. 13(1) is a plane view illustrating a configuration of the first electrodes 101, the second electrodes 102, the first extraction electrodes 103, the second extraction electrodes 104, the third extraction electrodes 105, and the fourth extraction electrodes 106 of the tactile sense presentation device. FIG. 13(2) is longitudinal sectional views of the tactile sense presentation device illustrated in FIG. 13(1) taken along lines (a) and (b). FIG. 13(3) is a block diagram of the tactile sense presentation device including the data processing unit 50, the electrostatic tactile sense driver unit 52, the electric current tactile sense driver unit 54, and an electrostatic contact sensing unit 60.

As illustrated in FIGS. 13(1) and 13(2), the semiconductor circuits (TFT) 7 are provided below the first electrodes 101 and the second electrodes 102. As also illustrated in FIG. 5, the first extraction electrodes 103, the second extraction electrodes 104, the third extraction electrodes 105, and the fourth extraction electrodes 106 connected with the semiconductor circuits (TFT) 7 contain a plurality of signal lines (see arrows from a). On the other hand, each of the first extraction electrodes 103 and the second extraction electrodes 104 which are not connected with the semiconductor circuits (TFT) 7 is made of a single signal line (see arrows from β). Further, as illustrated in FIG. 13(3), the first extraction electrodes 103 and the second extraction electrodes 104 are connected with the electrostatic tactile sense driver unit 52 and the electrostatic contact sensing unit 60, and the third extraction electrodes 105 and the fourth extraction electrodes 106 are connected with the electric current tactile sense driver unit 54. Therefore, the data processing unit 50 controls signals to be given to the first electrodes 101 through the first extraction electrodes 103 and the second extraction electrodes 104 by the electrostatic tactile sense driver unit 52 and the electrostatic contact sensing unit 60. The data processing unit 50 also controls signals to be given to the second electrodes 102 through the third extraction electrodes 105 and the fourth extraction electrodes 106 by the electric current tactile sense driver unit 54.

As illustrated in FIG. 13(3), the data processing unit 50 also processes data related with an external image display unit 56. Therefore, the tactile sense presentation device illustrated in FIG. 13 can be used together with the external image display unit 56.

FIG. 14(1) is a diagram illustrating the first electrodes of the tactile sense presentation device illustrated in FIG. 13 operating as the touch sensor electrodes or the electrostatic tactile sense presenting electrodes. FIG. 14(2) is a diagram illustrating the second electrodes 102 of the tactile sense presentation device illustrated in FIG. 13 operating as the electric current tactile sense presenting electrodes.

In the tactile sense presentation device illustrated in FIG. 14(1), the cross-hatched first electrodes 101 operates as the touch sensor electrodes in a space sharing manner with the other first electrodes 101.

In the tactile sense presentation device illustrated in FIG. 14(1), a periodic voltage is applied between the first electrodes 101 with left down hatching (located almost in the center) and the first electrodes 101 with right down hatching. Therefore, on the condition that a dielectric (finger) is placed between these electrodes 101, a tactile sense of granularity can be given to the dielectric (finger). Further, these hatched first electrodes 101 also operate as the touch sensor electrodes in a time sharing manner.

In the tactile sense presentation device illustrated in FIG. 14(2), a periodic electric current is supplied between the second electrodes 102 which are filled with fine dots and the second electrodes 102 which are filled with coarse dots. Therefore, on the condition that an electric conductor (finger) is placed between these electrodes 102, a tactile sense of roughness can be given to the electric conductor (finger).

Fifth Embodiment

A manufacturing method of the tactile sense presentation device according to the embodiments of the present invention will be described.

Figure 16A:
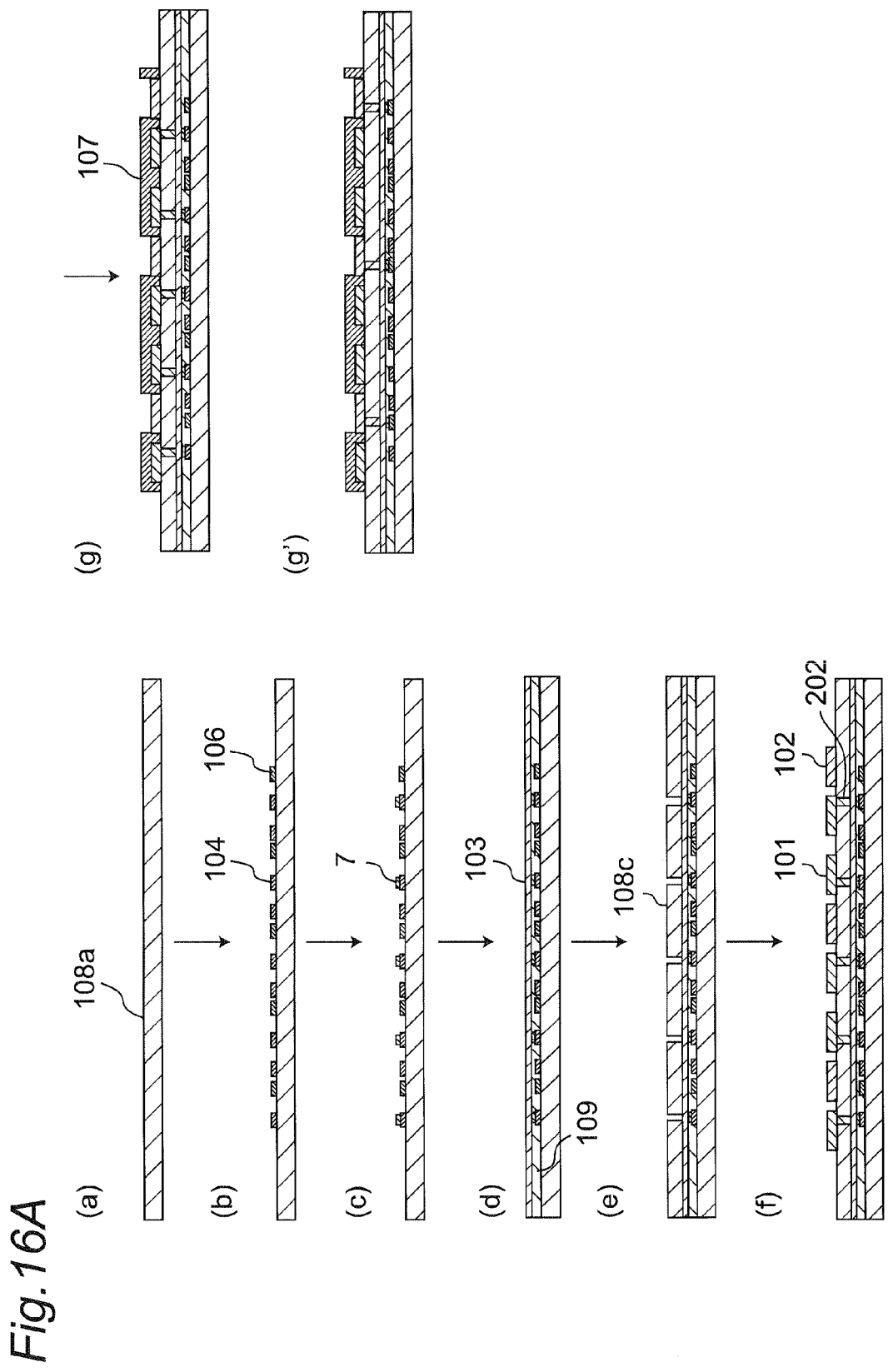
FIG. 16A illustrates an outline of a manufacturing method of the tactile sense presentation device which has the electrostatic tactile sense presenting electrodes and the electric current tactile sense presenting electrodes arranged on a same plane in which both of the electric current tactile sense presenting electrodes and the electrostatic tactile sense presenting electrodes function as dedicated electrodes.

5.1. Manufacturing Method of the Tactile Sense Presentation Device Having the Electrostatic Tactile Sense Presenting Electrodes and the Electric Current Tactile Sense Presenting Electrodes Arranged on the Same Plane FIGS. 15A, 15B, 16A, and 16B illustrate an outline of manufacturing methods of the tactile sense presentation device having the electrostatic tactile sense presenting electrodes and the electric current tactile sense presenting electrodes arranged on a same plane in which both of the electric current tactile sense presenting electrodes and the electrostatic tactile sense presenting electrodes function as dedicated electrodes (see the number (16) in the table shown in FIG. 8). FIGS. 15A and 16A illustrate longitudinal sectional views taken along a line crossing vias 202 which are connected with the first electrodes 101, whereas FIGS. 15B and 16B illustrate longitudinal sectional views taken along a line crossing vias 202 which are connected with the second electrodes 102 (though, FIG. 15A(j') illustrates a longitudinal sectional view taken along a line crossing the vias 202 which are connected with the second electrodes 102, whereas FIG. 16A(g') illustrates a longitudinal sectional view taken along a line crossing the vias 202 which are connected with the first electrodes 101).

In the method illustrated in FIGS. 15A and 15B, first, a section of the substrate 108a at the bottom is made ((a) to (d)), then, a section of a protective substrate 108b at the top is made ((e) to (i)), and finally, these substrates are bonded together ((j)). First, the second extraction electrodes 104 and the fourth electrodes 106 are placed on the substrate 108a ((a), (b)), and the semiconductor circuits 7 are placed on a part of the second extraction electrodes 104 (c). Then, an interlayer dielectric 109 is provided to cover the substrate 108a, the second extraction electrodes 104, the fourth extraction electrodes 106, and the semiconductor circuits 7. Further, the first extraction electrodes 103 and the third extraction electrodes 105 are placed on the semiconductor circuits 7 ((d)).

On the other hand, the vias 202 are formed in the protective substrate 108b ((e), (f)), and then, the first electrodes 101 and the second electrodes 102 to be connected with the vias 202 are placed at the top of the protective substrate 108b and connection electrodes 204 to be connected with the vias 202 are placed at the bottom of the protective substrate 108b, respectively ((g)). Then, the insulating film 107 is provided to cover the first electrodes 101 placed at the top of the protective substrate 108b ((h)). Finally, an adhesive 206 is applied to the bottom of the protective substrate 108b ((i)), and the top of the substrate 108a and the bottom of the protective substrate 108b are aligned and bonded ((j)). FIG. 15A(j') is a longitudinal sectional view taken along a line crossing the vias 202 which are connected with the second electrodes 102, illustrating that the vias 202 which are connected with the second electrodes 102 are connected with the connection electrodes 204, the third extraction electrodes 105, the semiconductor circuits 7, and the fourth extraction electrodes 106.

In the method illustrated in FIGS. 16A and 16B, the tactile sense presenting device is made upward serially from a section of the substrate 108a at the bottom ((a) to (g)). First, the second extraction electrodes 104 and the fourth electrodes 106 are placed on the substrate 108a ((a), (b)), and the semiconductor circuits 7 are placed on a part of the second extraction electrodes 104 (c). Then, the interlayer dielectric 109 is provided to cover the substrate 108a, the second extraction electrodes 104, the fourth extraction electrodes 106, and the semiconductor circuits 7. Further, the first extraction electrodes 103 and the third extraction electrodes 105 are placed on the semiconductor circuits 7 ((d)).

Then, an insulating layer 108c is provided to cover the first extraction electrodes 103 and the third extraction electrodes 105 ((e)). At this time, holes for the vias 202 are properly made above the second extraction electrodes 104, the semiconductor circuits 7, and the first extraction electrodes 103. After the insulating layer 108c is provided, the vias 202 to be connected with the semiconductor circuits 7 and the like are placed and the first electrodes 101 and the second electrodes 102 to be connected with the vias 202 are placed ((f)). Finally, the insulating film 107 is provided to cover the first electrodes 101 ((g)). FIG. 16A(g') is a longitudinal sectional view taken along a line crossing the vias 202 which are connected with the second electrodes 102, illustrating that the vias 202 which are connected with the second electrodes 102 are connected with the third extraction electrodes 105, the semiconductor circuits 7, and the fourth extraction electrodes 106.

Figure 17B:
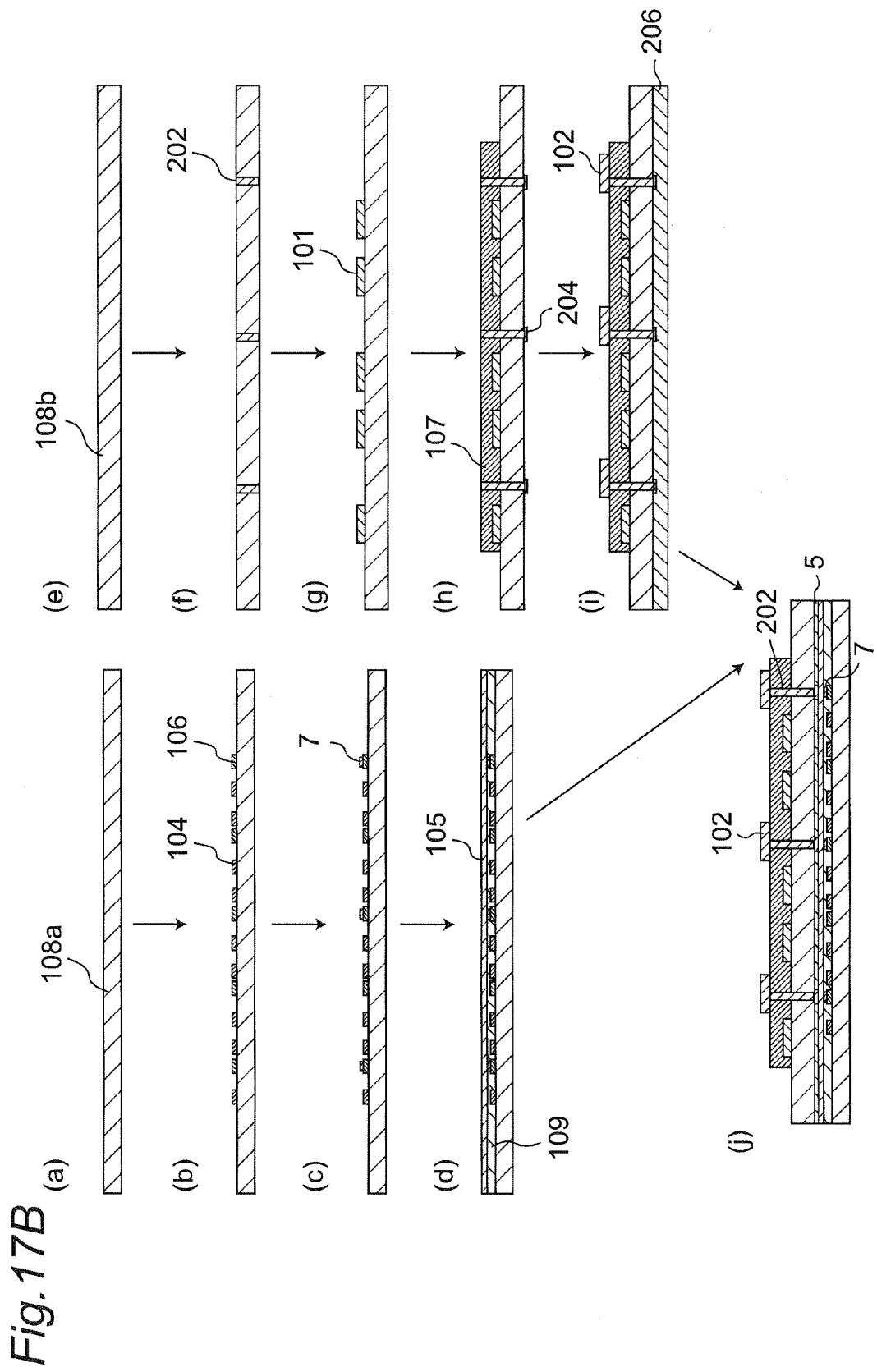
FIG. 17B illustrates an outline of a manufacturing method of the tactile sense presentation device which has the electrostatic tactile sense presenting electrodes and the electric current tactile sense presenting electrodes arranged on different planes in which both of the electric current tactile sense presenting electrodes and the electrostatic tactile sense presenting electrodes function as dedicated electrodes, different from FIG. 17A in a position taken for the cross section.
Figure 18A:
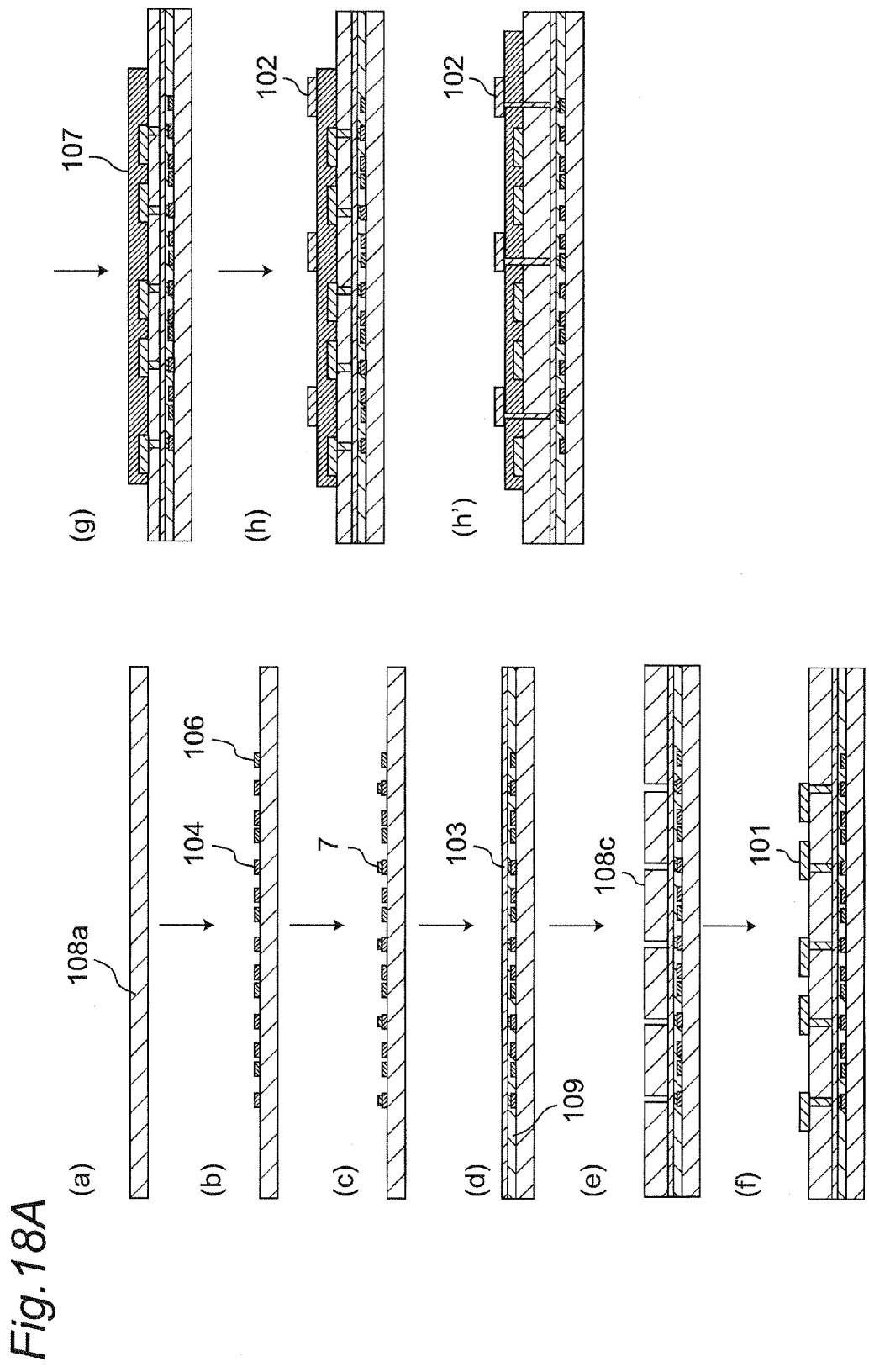
FIG. 18A illustrates an outline of a manufacturing method of the tactile sense presentation device which has the electrostatic tactile sense presenting electrodes and the electric current tactile sense presenting electrodes arranged on different planes in which both of the electric current tactile sense presenting electrodes and the electrostatic tactile sense presenting electrodes function as dedicated electrodes.
Figure 18B:
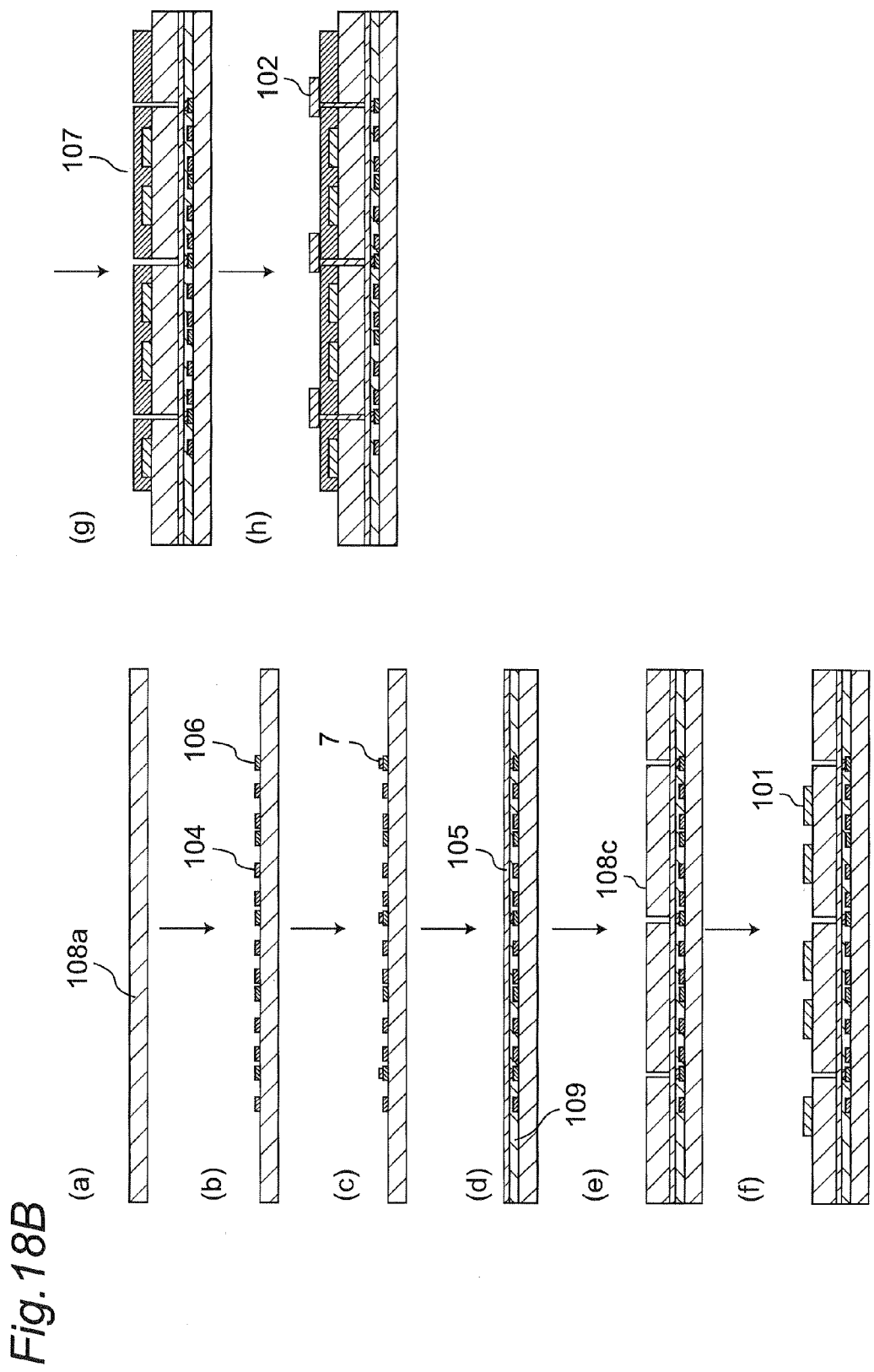
FIG. 18B illustrates an outline of a manufacturing method of the tactile sense presentation device which has the electrostatic tactile sense presenting electrodes and the electric current tactile sense presenting electrodes arranged on different planes in which both of the electric current tactile sense presenting electrodes and the electrostatic tactile sense presenting electrodes function as dedicated electrodes, different from FIG. 18A in a position taken for the cross section.

5.2. Manufacturing Method of the Tactile Sense Presentation Device Having the Electrostatic Tactile Sense Presenting Electrodes and the Electric Current Tactile Sense Presenting Electrodes Arranged on Different Planes FIGS. 17A, 17B, 18A, and 18B illustrate an outline of a manufacturing method of the tactile sense presentation device having the electrostatic tactile sense presenting electrodes and the electric current tactile sense presenting electrodes arranged on different planes in which both of the electric current tactile sense presenting electrodes and the electrostatic tactile sense presenting electrodes function as dedicated electrodes (see the number (16) in the table shown in FIG. 8). FIGS. 17A and 18A illustrate longitudinal sectional views taken along a line crossing vias 202 which are connected with the first electrodes 101, whereas FIGS. 17B and 18B illustrate longitudinal sectional views taken along a line crossing vias 202 which are connected with the second electrodes 102 (though, FIG. 17A(j') illustrates a longitudinal sectional view taken along a line crossing the vias 202 which are connected with the second electrodes 102, whereas FIG. 18A(h') illustrates a longitudinal sectional view taken along a line crossing the vias 202 which are connected with the first electrodes 101).

In the method illustrated in FIGS. 17A and 17B, first, a section of the substrate 108a at the bottom is made ((a) to (d)), then, a section of a protective substrate 108b at the top is made ((e) to (i)), and finally, these substrates are bonded together ((j)). First, the second extraction electrodes 104 and the fourth extraction electrodes 106 are placed on the substrate 108a ((a), (b)), and the semiconductor circuits 7 are placed on a part of the second extraction electrodes 104 (c). Then, the interlayer dielectric 109 is provided to cover the substrate 108a, the second extraction electrodes 104, the fourth extraction electrodes 106, and the semiconductor circuits 7. Further, the first extraction electrodes 103 and the third extraction electrodes 105 are placed on the semiconductor circuits 7 ((d)).

On the other hand, the vias 202 are formed in the protective substrate 108b ((e), (f)), and then, the first electrodes 101 to be connected with the vias 202 are placed at the top of the protective substrate 108b and connection electrodes 204 to be connected with the vias 202 are placed at the bottom of the protective substrate 108b, respectively ((g)). Then, the insulating film 107 is provided to cover the first electrodes 101 placed at the top of the protective substrate 108b ((h)). The second electrodes 102 to be connected with the vias 202 are placed on the top of the insulating film 107 and adhesive 206 is applied to the bottom of the protective substrate 108b ((i)). Finally, the top of the substrate 108a and the bottom of the protective substrate 108b are aligned and bonded ((j)). FIG. 17A(j') is a longitudinal sectional view taken along a line crossing the vias 202 which are connected with the second electrodes 102, illustrating that the vias 202 which are connected with the second electrodes 102 are connected with the connection electrodes 204, the third extraction electrodes 105, the semiconductor circuits 7, and the fourth extraction electrodes 106.

In the method illustrated in FIGS. 18A and 18B, the tactile sense presenting electrode is made upward serially from a section of the substrate 108a at the bottom ((a) to (h)). First, the second extraction electrodes 104 and the fourth extraction electrodes 106 are placed on the substrate 108a ((a), (b)), and the semiconductor circuits 7 are placed on a part of the second extraction electrodes 104 (c). Then, the interlayer dielectric 109 is provided to cover the substrate 108a, the second extraction electrodes 104, the fourth extraction electrodes 106, and the semiconductor circuits 7. Further, the first extraction electrodes 103 and the third extraction electrodes 105 are placed on the semiconductor circuits 7 ((d)).

Then, an insulating layer 108c is provided to cover the first extraction electrodes 103 and the third extraction electrodes 105 ((e)). At this time, holes for the vias 202 are properly made above the second extraction electrodes 104, the semiconductor circuits 7, and the first extraction electrodes 103. After the insulating layer 108c is provided, the vias 202 to be connected with the semiconductor circuits 7 and the like are placed and the first electrodes 101 to be connected with the vias 202 are placed ((f)). The insulating film 107 is provided to cover the first electrodes 101 and the insulating layer 108c ((g)). Finally, the second electrodes 102 to be connected with the vias 202 are placed on the top of the insulating film 107 ((h)). FIG. 18A(h') is a longitudinal sectional view taken along a line crossing the vias 202 which are connected with the second electrodes 102, illustrating that the vias 202 which are connected with the second electrodes 102 are connected with the third extraction electrodes 105, the semiconductor circuits 7, and the fourth extraction electrodes 106.

(Abstract of One Aspect According to the Invention)

(1) A tactile sense presentation method, comprising:

arranging a plurality of first electrodes covered with an insulating film on a same plane;

arranging a plurality of second electrodes on a same plane with tops exposed to outside; and performing a first operation in parallel with a second operation, wherein the first operation is for applying temporally changing first voltages to a part of the plurality of first electrodes to generate electric fields which are changed by the part of the plurality of first electrodes, and the second operation is for applying temporally changing first electric currents to a part of the plurality of second electrodes to cause the electric currents to flow from the part of the plurality of second electrodes to second electrodes which are different from the part of the plurality of second electrodes via electric conductors.

The electrostatic tactile sense presenting electrodes, providing an electrostatic force, are capable of presenting imitational feels of granularity and smoothness. On the other hand, the electric current tactile sense presenting electrodes, providing electric current stimulation, are capable of presenting an imitational feel of roughness of steps. The tactile sense presentation device according to this aspect provided with a combination of a great number of these electrodes which are fine electrodes is capable of presenting elaborate tactile senses with mixed feels of granularity and roughness.

(2) A tactile sense presentation method in accordance with the second aspect of the invention may be the tactile sense presentation method in accordance with the first aspect of the invention, further comprising performing a third operation and the first operation in a time sharing manner or a space sharing manner, wherein the third operation is for applying temporally changing second voltages to a part of the plurality of first electrodes to detect voltages generated in at least another part of the rest of the part of the plurality of first electrodes under the second voltage applied state and to detect positions of dielectrics which are in the vicinity of a tactile sense presentation device based on the detected voltages.

As a result, the tactile sense presentation method can provide electrodes which carry out both of an electrostatic tactile sense presenting function and a touch sensor function. Thereby the whole configuration of the device performing the tactile sense presentation method can be downsized and simplified.

(3) A tactile sense presentation method in accordance with the third aspect of the invention may be the tactile sense presentation method in accordance with the second aspect of the invention, characterized in that places of the first electrodes where the first operation is performed and places of the second electrodes where the second operation is performed are determined based on the position of the dielectric which is in the vicinity of the tactile sense presentation device detected in the third operation.

As a result, the tactile sense presentation method can provide electrodes which carry out both of an electrostatic tactile sense presenting function and a touch sensor function. Thereby the whole configuration of the device performing the tactile sense presentation method can be downsized and simplified.

(4) A tactile sense presentation method in accordance with the fourth aspect of the invention may be the tactile sense presentation method in accordance with the first aspect of the invention, further comprising performing a fourth operation and the second operation in a time sharing manner or a space sharing manner, wherein the fourth operation is for applying temporally changing third voltages to a part of the plurality of second electrodes to detect voltages generated in at least another part of the rest of the part of the plurality of second electrodes under the third voltage applied state and to detect positions of dielectrics which are in the vicinity of a tactile sense presentation device based on the detected voltages.

As a result, the tactile sense presentation method can provide electrodes which carry out both of an electric current tactile sense presenting function and a touch sensor function. Thereby the whole configuration of the device performing the tactile sense presentation method can be downsized and simplified.

(5) A tactile sense presentation method in accordance with the fifth aspect of the invention may be the tactile sense presentation method in accordance with the fourth aspect of the invention, characterized in that places of the first electrodes where the first operation is performed and places of the second electrodes where the second operation is performed are determined based on the position of the dielectric which is in the vicinity of the tactile sense presentation device detected in the fourth operation.

As a result, the tactile sense presentation method can provide electrodes which carry out both of an electric current tactile sense presenting function and a touch sensor function. Thereby the whole configuration of the device performing the tactile sense presentation method can be downsized and simplified.

(6) A tactile sense presentation method in accordance with the sixth aspect of the invention may be the tactile sense presentation method in accordance with the first aspect of the invention, further comprising performing a third operation and the first operation in a time sharing manner or a space sharing manner, wherein the third operation is for applying temporally changing second voltages to a part of the plurality of first electrodes to detect voltages generated in at least another part of the rest of the part of the plurality of first electrodes under the second voltage applied state and to detect positions of dielectrics which are in the vicinity of a tactile sense presentation device based on the detected voltages, and performing a fourth operation and the second operation in a time sharing manner or a space sharing manner, wherein the fourth operation is for applying temporally changing third voltages to a part of the plurality of second electrodes to detect voltages generated in at least another part of the rest of the part of the plurality of second electrodes under the third voltage applied state and to detect positions of the dielectrics which are in the vicinity of the tactile sense presentation device based on the detected voltages.

As a result, the tactile sense presentation method can provide electrodes which carry out both of an electrostatic tactile sense presenting function and a touch sensor function, and electrodes which carry out both of an electric current tactile sense presenting function and a touch sensor function. Thereby the whole configuration of the device performing the tactile sense presentation method can be downsized and simplified.

(7) A tactile sense presentation method in accordance with the seventh aspect of the invention may be the tactile sense presentation method in accordance with the sixth aspect of the invention, characterized in that places of the first electrodes where the first operation is performed and places of the second electrodes where the second operation is performed are determined based on the positions of the dielectric which is in the vicinity of the tactile sense presentation device detected in the third operation and the fourth operation.

As a result, the tactile sense presentation method can provide electrodes which carry out both of an electrostatic tactile sense presenting function and a touch sensor function, and electrodes which carry out both of an electric current tactile sense presenting function and a touch sensor function. Thereby the whole configuration of the device performing the tactile sense presentation method can be downsized and simplified.

(8) A tactile sense presentation method in accordance with the eighth aspect of the invention may be the tactile sense presentation method in accordance with any one of the first to seventh aspects of the invention, characterized by presenting a tactile sense corresponding to an image as superimposed on the image.

As a result, the tactile sense presentation method can provide electrodes which carry out both of an electrostatic tactile sense presenting function and a touch sensor function, and electrodes which carry out both of an electric current tactile sense presenting function and a touch sensor function. Thereby the whole configuration of the device performing the tactile sense presentation method can be downsized and simplified.

(9) A tactile sense presentation method in accordance with the ninth aspect of the invention may be the tactile sense presentation method in accordance with any one of the first to eighth of the invention, characterized in that voltage strengths, periods, and intervals of the temporally changing first voltages, and current strengths, periods, and intervals of the temporally changing first electric currents are determined based on a tactile sense to be presented.

As a result, the tactile sense presentation method can provide electrodes which carry out both of an electrostatic tactile sense presenting function and a touch sensor function, and electrodes which carry out both of an electric current tactile sense presenting function and a touch sensor function. Thereby the whole configuration of the device performing the tactile sense presentation method can be downsized and simplified.

INDUSTRIAL APPLICABILITY

The tactile sense presentation device with a touch panel function according to the present disclosure can be applied to personal digital assistants such as smart phones and smart pads, operation panels for automobiles and home appliances, and guide plates for the visually impaired and the like.

DESCRIPTION OF REFERENCE CHARACTERS 2 tactile sense presentation device with touch panel function
4 electrostatic tactile sense presenting electrode
6 electric current tactile sense presenting electrode
7 semiconductor circuit
21 Y-direction select line (touch drive)
22 Y-direction select line (tactile sense-positive)
23 Y-direction select line (touch sense)
24 Y-direction select line (tactile sense-negative)
31 drive line (touch drive)
32 X-direction select line (touch drive)
33 drive line (tactile sense-positive)
34 X-direction select line (tactile sense-positive)
drive line (touch sense)
36 X-direction select line (touch sense)
37 drive line (tactile sense-negative)
38 X-direction select line (tactile sense-negative)
50 data processing unit
52 electrostatic tactile sense driver unit
54 electric current tactile sense driver unit
56 external image display unit
58 external contact sensing unit
60 electrostatic contact sensing unit
101 first electrode
102 second electrode
103 first extraction electrode
104 second extraction electrode
105 third extraction electrode
106 fourth extraction electrode
107 insulating film
108a substrate
108b protective substrate
108c insulating layer
109 interlayer dielectric
110 dielectric
111 positive electrostatic interaction electrode
112 negative electrostatic interaction electrode
113 voltage source
114 electric conductor
115 positive electric current interaction electrode
116 negative electric current interaction electrode
117 current source
202 via
204 connection electrode
206 adhesive

The invention claimed is:

1. A method for presenting tactile sense to an object using a tactile sense presentation device including a plurality of first electrodes, an insulating film covering the plurality of first electrodes, and a plurality of second electrodes, respective tops of the plurality of second electrodes being uncovered by the insulating film, the method comprising:
   (i) applying a temporally-changing first voltage to a first part of the plurality of first electrodes to generate a temporally-changing electric field in the object contacting the insulating film above the first part of the plurality of first electrodes across the insulating film;
   (ii) applying a temporally-changing first electric current to a first part of the plurality of second electrodes to cause the first electric current to flow through the object contacting the first part of the plurality of second electrodes; and
   (iii) applying a temporally-changing second voltage to a second part of the plurality of first electrodes, and detecting a voltage between the second part of the plurality of first electrodes and a third part of the plurality of first electrodes to detect position of the object.

2. The method according to claim 1, wherein the step (i) and the step (iii) are performed in one of a time sharing manner or a space sharing manner.

3. The method according to claim 1, wherein the first part of the plurality of first electrodes and the first part of the plurality of second electrodes are determined based on the position of the object which is detected in the step (iii).

4. The method according to claim 1, further comprising:
   (iv) applying a temporally-changing third voltage to a second part of the plurality of second electrodes, and detecting a voltage between the second part of the plurality of second electrodes and a third part of the plurality of second electrodes to detect a position of the object, wherein
   the step (ii) and the step (iv) are performed in one of a time sharing manner or a space sharing manner.

5. The method according to claim 4, wherein the first part of the plurality of first electrodes and the first part of the plurality of second electrodes are determined based on the position of the object which is detected in the step (iv).

6. The method according to claim 4, wherein the step (i) and the step (iii) are performed in one of a time sharing manner or a space sharing manner.

7. The method according to claim 6, wherein the first part of the plurality of first electrodes and the first part of the plurality of second electrodes are determined based on the position of the object which is detected in the step (iii) and the step (iv).

8. The method according to claim 1, wherein:
the tactile sense presentation device is located on an image display for displaying an image; and
the first voltage and the first electric current are applied in accordance with the image displayed on the image display.

9. The method according to claim 1, wherein voltage strength, periods, and intervals of the first voltage, and current strength, periods, and intervals of the first electric current are determined in accordance with a tactile sense to be presented.

10. The method according to claim 1, wherein:
the plurality of first electrodes are arranged on a first plane; and
the plurality of second electrodes are arranged on a second plane.

11. The method according to claim 10, wherein the first plane is a same plane as the second plane.

\* \* \* \* \*